US012736025B2

(12) United States Patent
Obermeyer

(10) Patent No.: US 12,736,025 B2
(45) Date of Patent: Sep. 15, 2026

(54) FLUID CONNECTION FOR A HYDROMOTIVE MACHINE

(71) Applicant: Henry K. Obermeyer, Welliington, CO (US)

(72) Inventor: Henry K. Obermeyer, Welliington, CO (US)

(73) Assignee: Henry K. Obermeyer, Wellington, CO (US)

( * ) Notice: Subject to any disclaimer, the term of this patent is extended or adjusted under 35 U.S.C. 154(b) by 0 days.

(21) Appl. No.: 19/278,147

(22) Filed: Jul. 23, 2025

(65) Prior Publication Data

US 2025/0347261 A1 Nov. 13, 2025

Related U.S. Application Data

(63) Continuation of application No. 18/641,130, filed on Apr. 19, 2024, now Pat. No. 12,378,938.

(60) Provisional application No. 63/461,194, filed on Apr. 21, 2023.

(51) Int. Cl.

| | |
|---|---|
| ***F03B 3/18*** | (2006.01) |
| ***F03B 3/10*** | (2006.01) |
| ***F04D 29/42*** | (2006.01) |
| ***F04D 29/52*** | (2006.01) |

(52) U.S. Cl.

CPC ................ *F03B 3/18* (2013.01); *F03B 3/103* (2013.01); *F04D 29/4293* (2013.01); *F04D 29/528* (2013.01); *F05B 2240/12* (2013.01); *F05B 2250/12* (2013.01); *F05B 2250/14* (2013.01); *F05B 2250/141* (2013.01)

(58) Field of Classification Search

CPC .......... F03B 3/10; F03B 3/103; F04D 17/105; F04D 29/4213; F04D 29/424; F04D 29/4273; F04D 29/4293; F04D 29/522; F04D 29/528

See application file for complete search history.

(56) References Cited

U.S. PATENT DOCUMENTS

| | | | |
|---|---|---|---|
| 3,093,084 A | 6/1963 | Derderian | |
| 4,235,672 A | 11/1980 | Harant et al. | |
| 4,380,084 A | 4/1983 | Abert | |
| 9,816,512 B2 | 11/2017 | Smith | |
| 11,300,093 B2 | 4/2022 | Obermeyer et al. | |
| 12,378,938 B2 * | 8/2025 | Obermeyer | F16L 41/023 |
| 2017/0016455 A1 | 1/2017 | Smith et al. | |

(Continued)

FOREIGN PATENT DOCUMENTS

| | | |
|---|---|---|
| CN | 110366622 A | 10/2019 |
| WO | 2022050269 A1 | 3/2022 |

OTHER PUBLICATIONS

International Search Report and Written Opinion for Parallel International Application issued in International Application No. PCT/US2024/025552, mailed Aug. 14, 2024.

(Continued)

*Primary Examiner* — Christopher R Legendre

(57) ABSTRACT

A fluid connection for a hydromotive machine or fluid-control valve having a first duct and a second duct. The first duct includes a mid-portion between a first end of the first duct and a second end of the first duct that has a non-circular cross-section. A second end of the first duct is wholly within the second end of the second duct. A first end of the second duct is wholly outside of the first duct.

15 Claims, 22 Drawing Sheets

(56) References Cited

U.S. PATENT DOCUMENTS

| | | | | |
|---|---|---|---|---|
| 2021/0202121 | A1 | 7/2021 | Bezlepkin et al. | |
| 2024/0352913 | A1 | 10/2024 | Obermeyer | |
| 2025/0052187 | A1 | 2/2025 | Obermeyer | |
| 2025/0347261 | A1 * | 11/2025 | Obermeyer ........... | F16L 41/023 |

OTHER PUBLICATIONS

U.S. Appl. No. 63/461,194, filed Apr. 21, 2023.
Parent U.S. Appl. No. 18/641,130, filed Apr. 19, 2024.

* cited by examiner

FLUID CONNECTION FOR A HYDROMOTIVE MACHINE

CROSS-REFERENCES TO RELATED APPLICATIONS

This patent application is a continuation application of prior U.S. application Ser. No. 18/641,130, filed Apr. 19, 2024, which itself claims the benefit of provisional Application No. 63/461,194 filed Apr. 21, 2023, which application is incorporated into the present disclosure by this reference.

TECHNICAL FIELD

The subject matter is related to apparatus for fluid connections for hydromotive machines with toroidal impellers.

BACKGROUND

Volute diffusers, also known as scroll cases, are commonly used in conjunction with conventional centrifugal pumps and blowers, for example. In such assemblies, fluid enters the eye of the impeller axially and is discharged radially with a tangential velocity component. Conventional volute diffusers are not compatible with the toroidal, centrifugal impeller disclosed in U.S. Pat. No. 11,300,093, where the flow enters the impeller axially through the "eye" of the impeller just as in the case of a conventional centrifugal impeller, but exits the impeller axially, in the direction from which it came, adjacent the outer rim of the impeller.

A shortcoming of conventional volute diffusers is that they inherently lack axial symmetry and can be less efficient at converting the kinetic energy of the impeller discharge stream to pressure, in comparison to the axisymmetric diffuser disclosed in U.S. Pat. No. 11,300,093. A further shortcoming of conventional volute diffusers is that they are significantly larger than the impellers from which they accept discharge. This requires an unnecessarily large spacing between adjacent machines. For example, FIG. 60 shows a conventional pump 169 having a conventional volute diffuser 170, and FIG. 61 illustrates a collection of such conventional pumps 169. As indicated in FIGS. 60 and 61, the diameter 171 of the scroll case is significantly larger than the diameter 172 of the runner. And the scroll-case diameter 171 of the conventional volute diffuser 170 determines the minimum spacing 173 between conventional pumps 169. Accordingly, for conventional pumps 169, the minimum spacing 173 between pumps is significantly higher than the runner diameter 172 because of the scroll-case diameter 171.

A disadvantage of the otherwise efficient axial diffuser disclosed in U.S. Pat. No. 11,300,093 is that the flow exiting the diffuser surrounds the incoming flow to the pump or blower, preventing the use of simple, conventional, and separate connections to the inlet and outlet flow streams. In the same way, conventional volute diffusers are ill-suited for use with the coaxial inlet and outlet ports characteristic of hydromotive machines, such as pumps, blowers, and turbines with toroidal impellers. The pitless adaptors disclosed in U.S. Pat. No. 11,300,093 are well suited for use in conjunction with submersible pumps and submersible pump turbines but are ill-suited for use in conjunction with many pump installations.

Configurations of the disclosed technology address shortcomings in the prior art.

DETAILED DESCRIPTION

As described in this document, aspects are directed to a fluid connection for use with a hydromotive machine. Configurations of the disclosed technology provide a low head-loss connection for coaxial inlet and outlet ports with opposite flow directions as found in hydromotive machines with toroidal impellers. Configurations provide separate inlet and outlet connections that may be oriented as required for a variety of applications.

Hydromotive machines include, as examples, pumps, reversible pump-turbines, turbines, blowers, compressors, turbochargers, superchargers, and gas turbines. In particular, aspects are directed to a fluid connection for use with a hydromotive machine where the direction of flow into the inlet is opposite (i.e. 180°) to the direction of flow out of the outlet of the hydromotive machine. In configurations, this is because the hydromotive machine includes toroidal impellers, such as those disclosed in U.S. Pat. No. 11,300,093.

Figure 1:
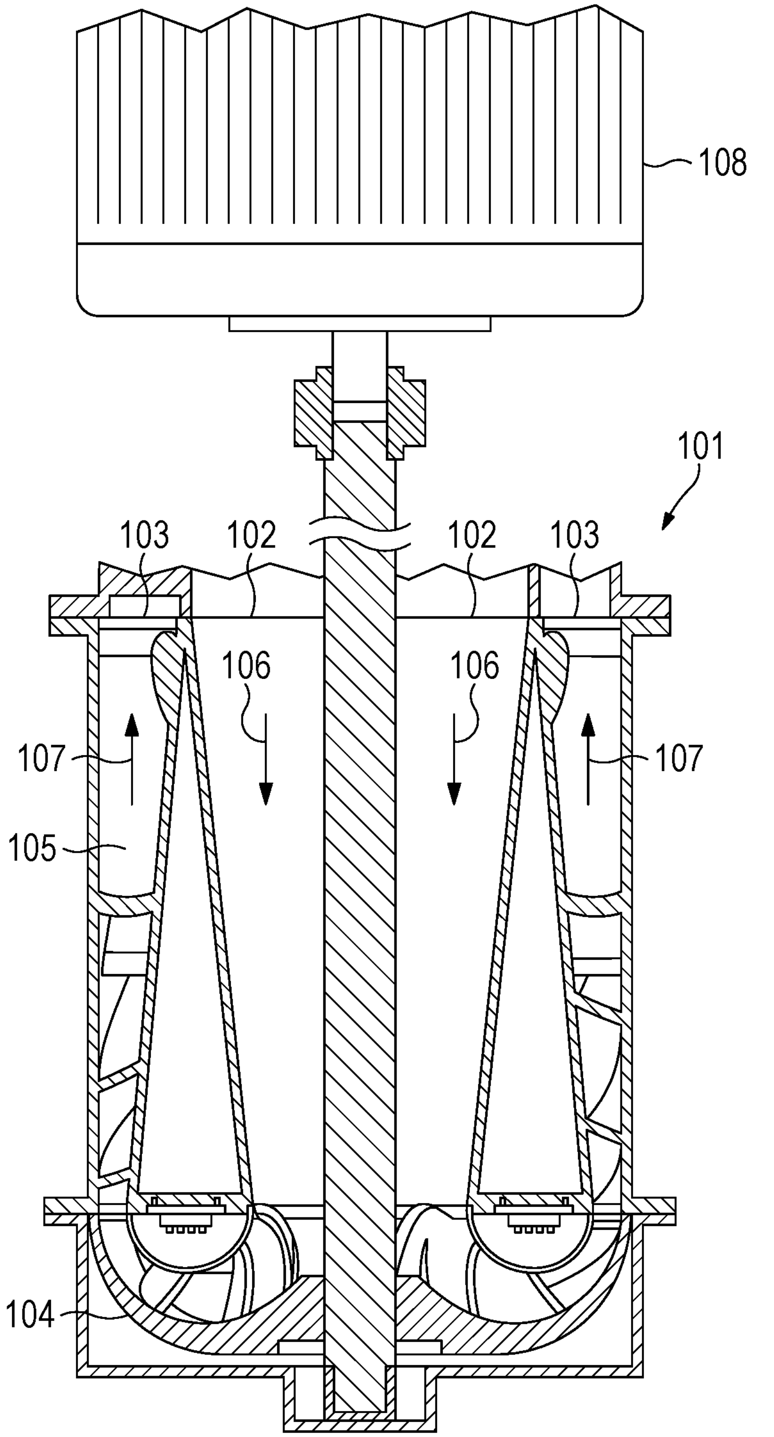
FIG. 1 is a cross section of an example reversible pump-turbine.
Figure 2:
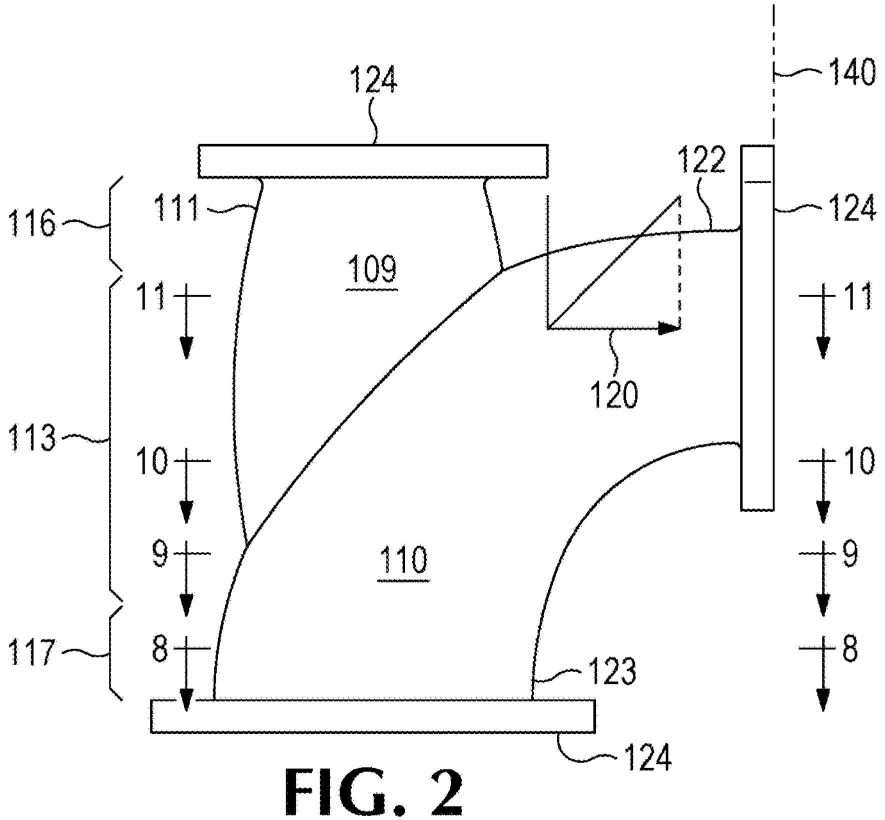
FIG. 2 is a front view of a fluid connection, according to an example configuration.

With reference to FIG. 1, FIG. 1 is a cross section of an example hydromotive machine. As illustrated in FIG. 1, a hydromotive machine 101, in this case a reversible pump-turbine, may include a pump inlet 102, a pump outlet 103, toroidal impellers 104, and a pump diffuser 105. During pumping mode of the reversible pump-turbine 101, water or other fluid enters the reversible pump-turbine 101 through the pump inlet 102. Work is done to the fluid by the toroidal impellers 104, namely by increasing the velocity of the fluid and by diverting the fluid 180 degrees from the direction 106 of flow through the pump inlet 102. The pump diffuser 105 reduces the velocity of the fluid, thereby increasing the pressure of the fluid, before the fluid exits the reversible pump-turbine 101 through the pump outlet 103. As noted, the direction 107 of flow through the pump outlet 103 is opposite to the direction 106 of flow through the pump inlet 102. As illustrated in FIG. 1, the toroidal impellers 104 may be driven by an electric motor 108.

The flow directions of FIG. 1 are reversed when the reversible pump-turbine 101 operates in turbine mode. During turbine mode, water or other fluid enters the reversible pump-turbine 101 through what is the pump diffuser 105 in pumping mode. The toroidal impellers 104 function as a toroidal runner during turbine mode, turning energy from the moving fluid into kinetic energy of the runner. The pump inlet 102 functions as the turbine diffuser in turbine mode. The kinetic energy of the runner can be used, as an example, to generate electricity by driving the electric motor 108 in reverse so that it functions as an electric power generator.

While some of the discussion that follows is in reference to a reversible pump-turbine, for simplicity and readability the terminology of the pump mode of the reversible pump-turbine is used. Also, it is recognized that the hydromotive machine need not be a reversible pump-turbine in all configurations. Instead, as noted above, the hydromotive machine might also be, as examples, a pump, a turbine, a blower, a compressor, a turbocharger, a supercharger, or a gas turbine.

In a broad sense, configurations of the disclosed technology include a fluid connection that includes a first duct and a second duct. The first duct includes a mid-portion that has a non-circular cross-section. The second end of the first duct is wholly within the second end of the second duct. The first end of the second duct is wholly outside of the first duct. Configurations may also, or instead, include fairings. Configurations may also, or instead, include guide vanes.

As a result, configurations of the disclosed technology show improvement relative to prior art devices due to a reduction, and perhaps an elimination, of turbulent flow, and thus an increase in the extent to which flow is laminar.

Additionally, there are many applications for hydromotive machines for which space is limited, making compact, coplanar assemblies advantageous. Configurations of the disclosed technology allow for a more compact assembly than prior-art assemblies utilizing scroll cases. FIGS. 2-14 show various views of aspects of a fluid connection 100 for a hydromotive machine 101, according to an example configuration. The views are as described above in the Brief Description of the Drawings section. As illustrated in FIGS. 2-14, a fluid connection 100 may include a first duct 109 and a second duct 110.

Figure 5:
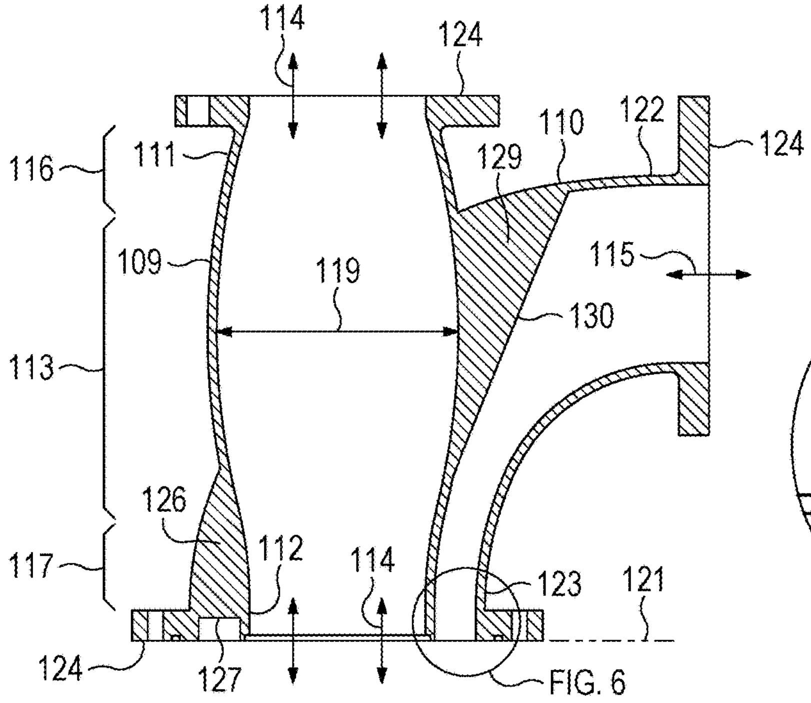
FIG. 5 is a sectional view of the fluid connection of FIG. 2, taken along the line indicated in FIG. 4.
Figure 6:
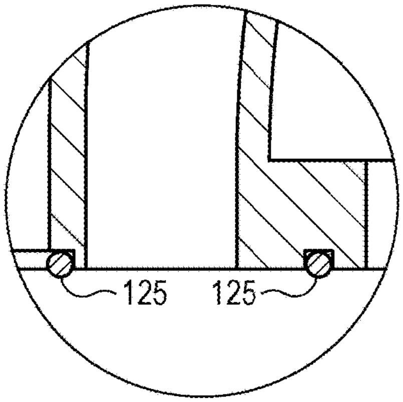
FIG. 6 is a detail view of a portion of FIG. 5.
Figure 7:
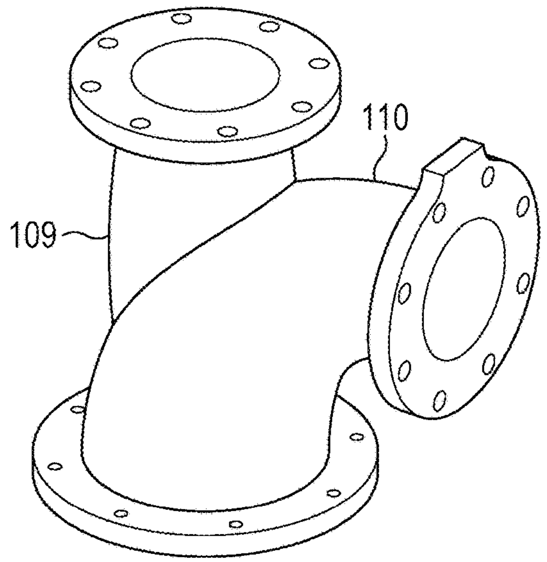
FIG. 7 is a perspective view of the fluid connection of FIG. 2.
Figure 8:
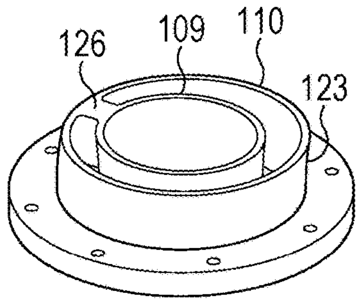
FIG. 8 is a sectional view of the fluid connection of FIG. 2, taken along the line indicated in FIG. 2.
Figure 9:
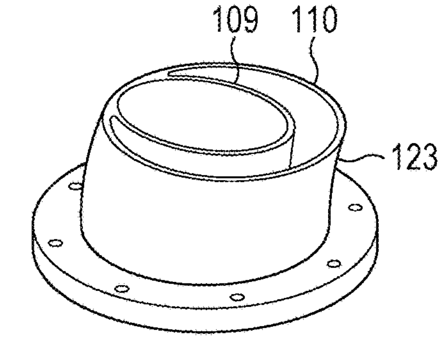
FIG. 9 is a sectional view of the fluid connection of FIG. 2, taken along the line indicated in FIG. 2.
Figure 10:
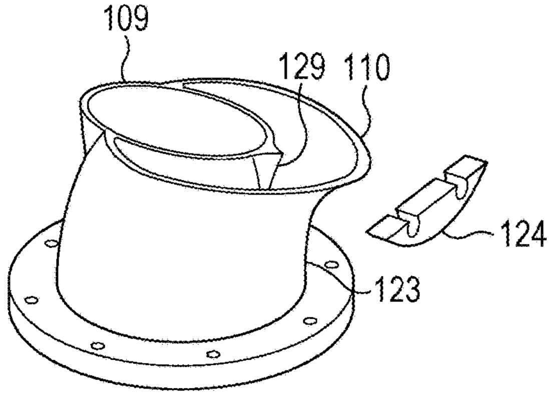
FIG. 10 is a sectional view of the fluid connection of FIG. 2, taken along the line indicated in FIG. 2.
Figure 11:
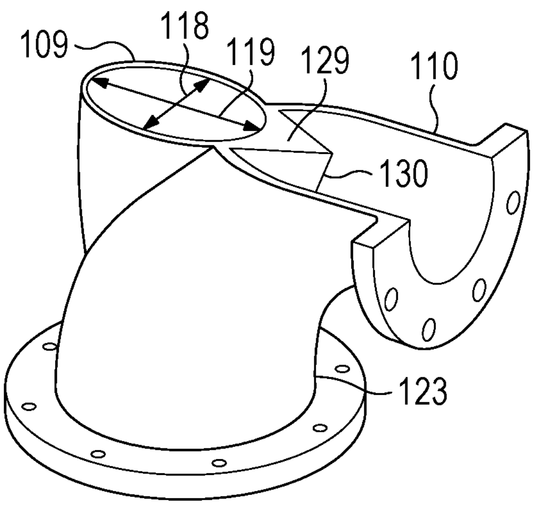
FIG. 11 is a sectional view of the fluid connection of FIG. 2, taken along the line indicated in FIG. 2.
Figure 12:
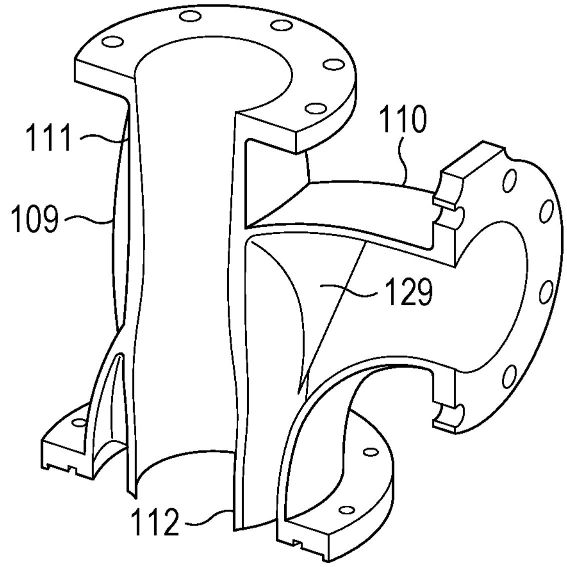
FIG. 12 is a sectional view of the fluid connection of FIG. 2, taken along the line indicated in FIG. 3.
Figure 13:
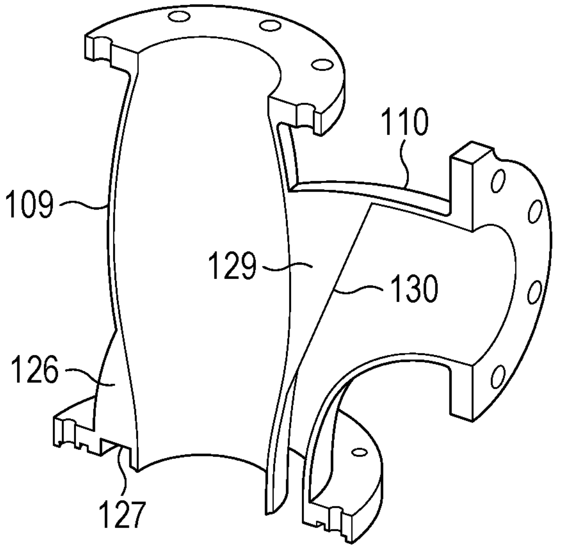
FIG. 13 is a sectional view of the fluid connection of FIG. 2, taken along the line indicated in FIG. 4.
Figure 14:
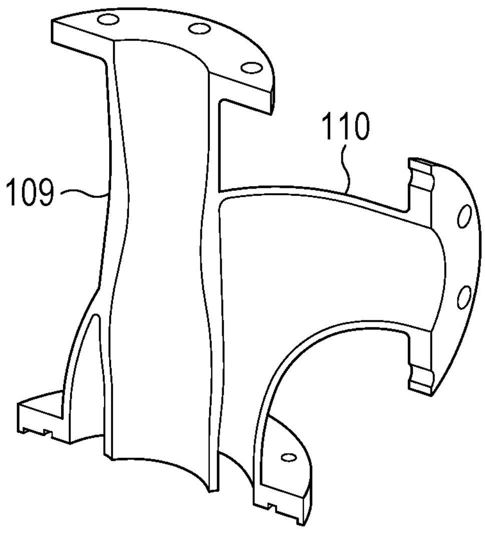
FIG. 14 is a sectional view of the fluid connection of FIG. 2, taken along the line indicated in FIG. 4.

The first duct 109 extends from a first end 111 of the first duct 109 to a second end 112 of the first duct 109. The first duct 109 includes a mid-portion 113 between the first end 111 of the first duct 109 and the second end 112 of the first duct 109 that has a non-circular cross-section. FIGS. 10 and 11, in particular, illustrate an example of the non-circular cross-section. As used in this context, "non-circular" means that it is not substantially circular (as defined below). In configurations, the non-circular cross-section of the mid-portion 113 is substantially elliptical. As used in this context, "substantially elliptical" means largely or essentially having the form of an ellipse without requiring perfect ellipticalness. With regard to the first duct 109 or the second duct 110, "cross-section" or "cross section" refers to a cutting plane that is perpendicular to the primary flow direction through the duct. The primary flow direction 114 through the first duct 109, and the primary flow direction 115 through the second duct 110 are as indicated in FIG. 5. Since, in configurations, the flow can be in either direction, the flow directions are indicated in FIG. 5 with double-ended arrows.

In configurations, the first duct 109 has a substantially circular cross-section at the first end 111 of the first duct 109 and a substantially circular cross-section at the second end 112 of the first duct 109. As used in this context, "substantially circular" means largely or essentially having the form of a circle without requiring perfect roundness.

In configurations, the first end 111 of the first duct 109 has a cross-sectional flow area that is substantially equal to a cross-sectional flow area of the second end 112 of the first duct 109 and to a cross-sectional flow area of the mid-portion 113 of the first duct 109. As used in this context, "substantially equal" means largely or essentially equivalent, without requiring perfect identicalness. Stated another way, in configurations the first duct 109 includes a first portion 116 between the first end 111 of the first duct 109 and the mid-portion 113 of the first duct 109 and a second portion 117 between the second end 112 of the first duct 109 and the mid-portion 113 of the first duct 109. And the cross-sectional area of the first portion 116 is substantially equal to the cross-sectional area of the second portion 117 and to the cross-sectional area of the mid-portion 113.

In configurations, the mid-portion 113 of the first duct 109 has a width in a first direction 118 that is less than a width of the mid-portion 113 of the first duct 109 in a second direction 119, the second direction 119 being substantially perpendicular to the first direction 118. (See FIG. 11, in particular.) As used in this disclosure, "substantially perpendicular" means largely or essentially at right angles, without requiring perfect perpendicularity. In examples of such configurations, the second duct 110 extends away from the first duct 109 in a direction that has a directional component 120 that is parallel to a plane 121 defined by the second end 123 of the second duct 110. And that directional component 120 is parallel to the second direction 119. As a result, the "thinning" the first duct 109 in the first direction 118 is 90° away from the orientation that would result in the maximum obstruction of the pump discharge flow through the second duct 110. "Flattening" the first duct 109 in the first direction 118, while maintaining a constant duct cross-sectional area, allows fluid in the second duct 110 to be deflected less severely, and with lower losses, while passing around the first duct 109.

The second duct 110 extends from a first end 122 of the second duct 110 to a second end 123 of the second duct 110. The second end 112 of the first duct 109 is wholly within the second end 123 of the second duct 110, while the first end 122 of the second duct 110 is wholly outside of the first duct 109. In configurations, the second end 123 of the second duct 110 is coaxial with the second end 112 of the first duct 109. In configurations, the second duct 110 has a substantially circular cross-section at the first end 122 of the second duct 110 and a substantially circular cross-section at the second end 123 of the second duct 110. In the configuration illustrated in FIGS. 2-14, the substantially circular cross-section at the second end 123 of the second duct 110 is substantially annular, meaning that it largely or essentially has the form of a ring.

In configurations, such as the configuration illustrated in FIGS. 2-14, each of the first end 111 of the first duct 109, the first end 122 of the second duct 110, and the second end 123 of the second duct 110 includes a flange 124. In each case, the respective flange 124 is for coupling the fluid connection 100 to adjoining conduits or machinery. Other connection methods, such as through grooved pipe couplings 137 (discussed below), compression couplings, welded connections, adhesively bonded connections, and sanitary fittings, could also be used. Sealing at the connection between the fluid connection 100 and the adjoining piping or machinery may be by elastomeric seals 125, gaskets, or other methods.

Figure 3:
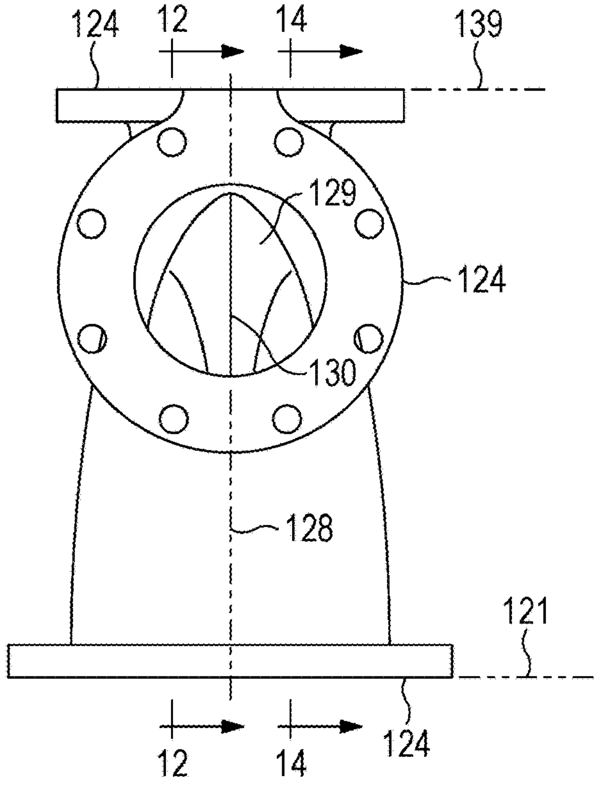
FIG. 3 is a right-side view of the fluid connection of FIG. 2.
Figure 4:
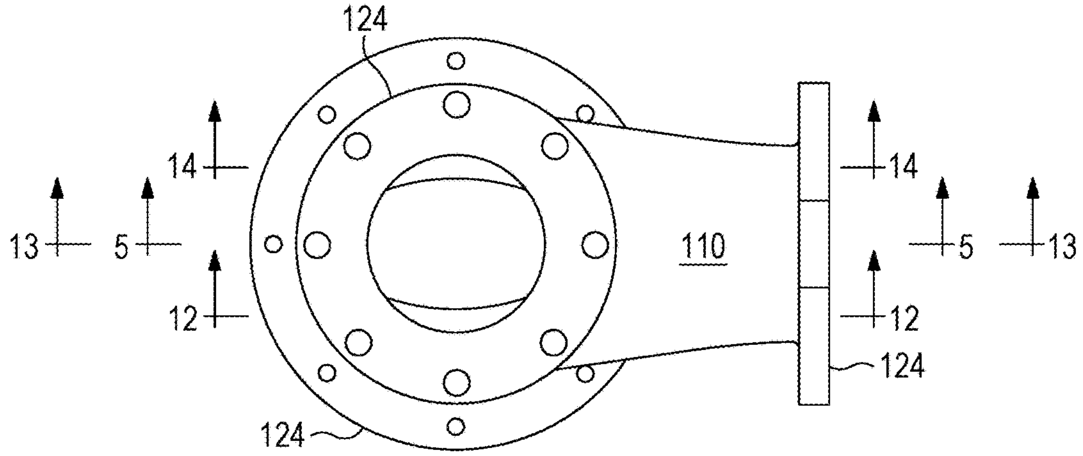
FIG. 4 is a top view of the fluid connection of FIG. 2.
Figure 51:
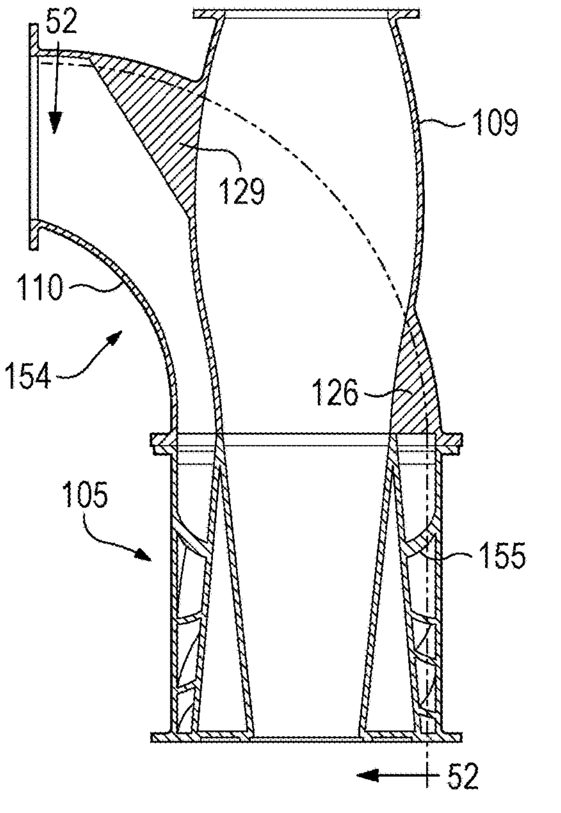
FIG. 51 is a sectional view of an example fluid connection, illustrating guide vanes and angled fairings according to an example configuration.
Figure 52:
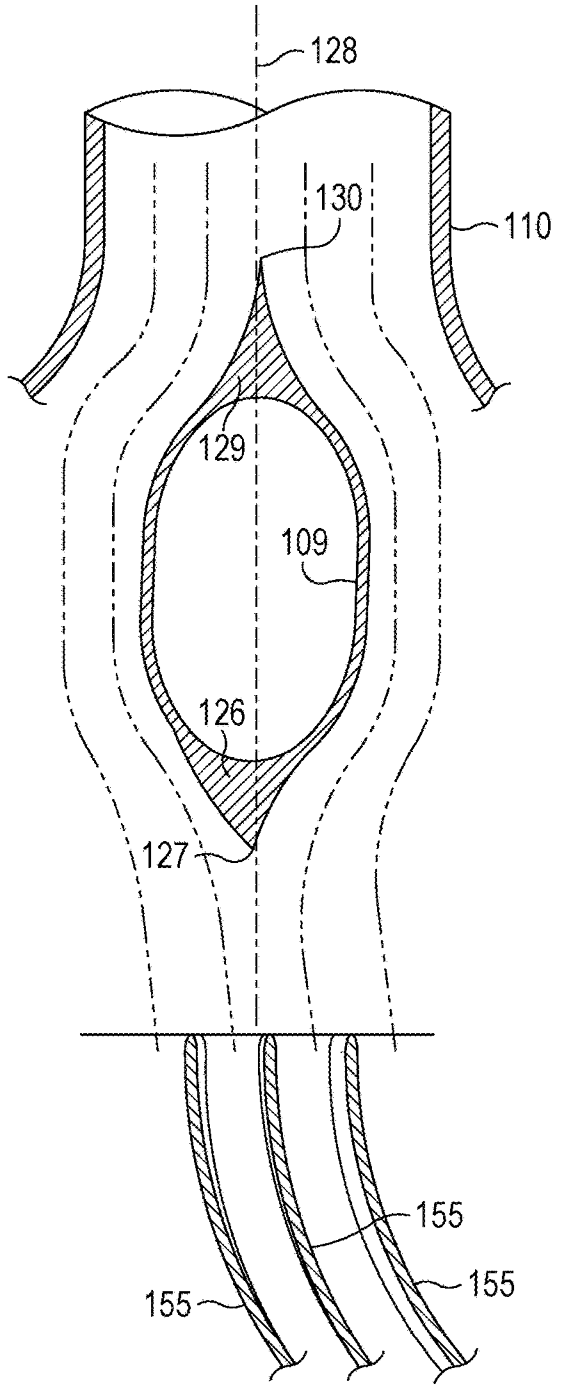
FIG. 52 is a sectional view of the fluid connection of FIG. 51, taken along the line indicated in FIG. 51.

As illustrated in FIGS. 2-14, some configurations of a fluid connection 100 include a first fairing 126 within the second duct 110. The first fairing 126 includes a wedge having a vertex 127 that radially extends between the second end 112 of the first duct 109 and the second end 123 of the second duct 110. The vertex 127 broadens into the wedge as the first fairing 126 extends away from the second end 123 of the second duct 110 toward the first end 122 of the second duct 110. In configurations, the fluid connection 100 has a plane of symmetry 128 as illustrated in FIG. 3. Each of the first duct 109 and the second duct 110 is substantially symmetrical about the plane of symmetry 128. As used in this context, "substantially symmetrical" means largely or essentially having a correspondence in size, shape, and relative position of features on opposite sides of the plane of symmetry 128, without requiring perfect symmetricalness of every feature. In some configurations, the first fairing 126 is canted at an angle to the plane of symmetry 128. In some configurations, the vertex 127 of the wedge of the first fairing 126 is not on the plane of symmetry 128. Instead, the vertex 127 of the wedge of the first fairing 126 is located other than on the plane of symmetry 128 so that the first fairing 126 is not symmetrical about the plane of symmetry 128. In some configurations, the vertex 127 of the wedge of the first fairing 126 is both canted at an angle to the plane of symmetry 128 and not on the plane of symmetry 128. Examples of asymmetric fairings are illustrated in FIGS. 51-52 and described below in connection with those drawings. Asymmetric fairings of the type described here and for FIGS. 51-52 may help reduce hydraulic losses in the second duct 110.

Returning to FIGS. 2-14, in configurations the fluid connection 100 include a second fairing 129 within the second duct 110. The second fairing 129 includes a wedge that extends away from the mid-portion 113 of the first duct 109 toward the second end 123 of the second duct 110 and terminates in a vertex 130. In some configurations, the second fairing 129 is canted at an angle to the plane of symmetry 128. In some configurations, the vertex 130 of the wedge of the second fairing 129 is not on the plane of symmetry 128. Instead, the vertex 130 of the wedge of the second fairing 129 is located other than on the plane of symmetry 128 so that the second fairing 129 is not symmetrical about the plane of symmetry 128. In some configurations, the vertex 130 of the wedge of the second fairing 129 is both canted at an angle to the plane of symmetry 128 and not on the plane of symmetry 128. An example of asymmetric fairings is illustrated in FIGS. 51-52.

Returning to FIGS. 2-14, in configurations the fluid connection 100 includes the first fairing 126 and the second fairing 129. In configurations, the fluid connection 100 includes neither the first fairing 126 nor the second fairing 129. In configurations, the fluid connection 100 includes either, but not both, the first fairing 126 or the second fairing 129.

Figure 34:
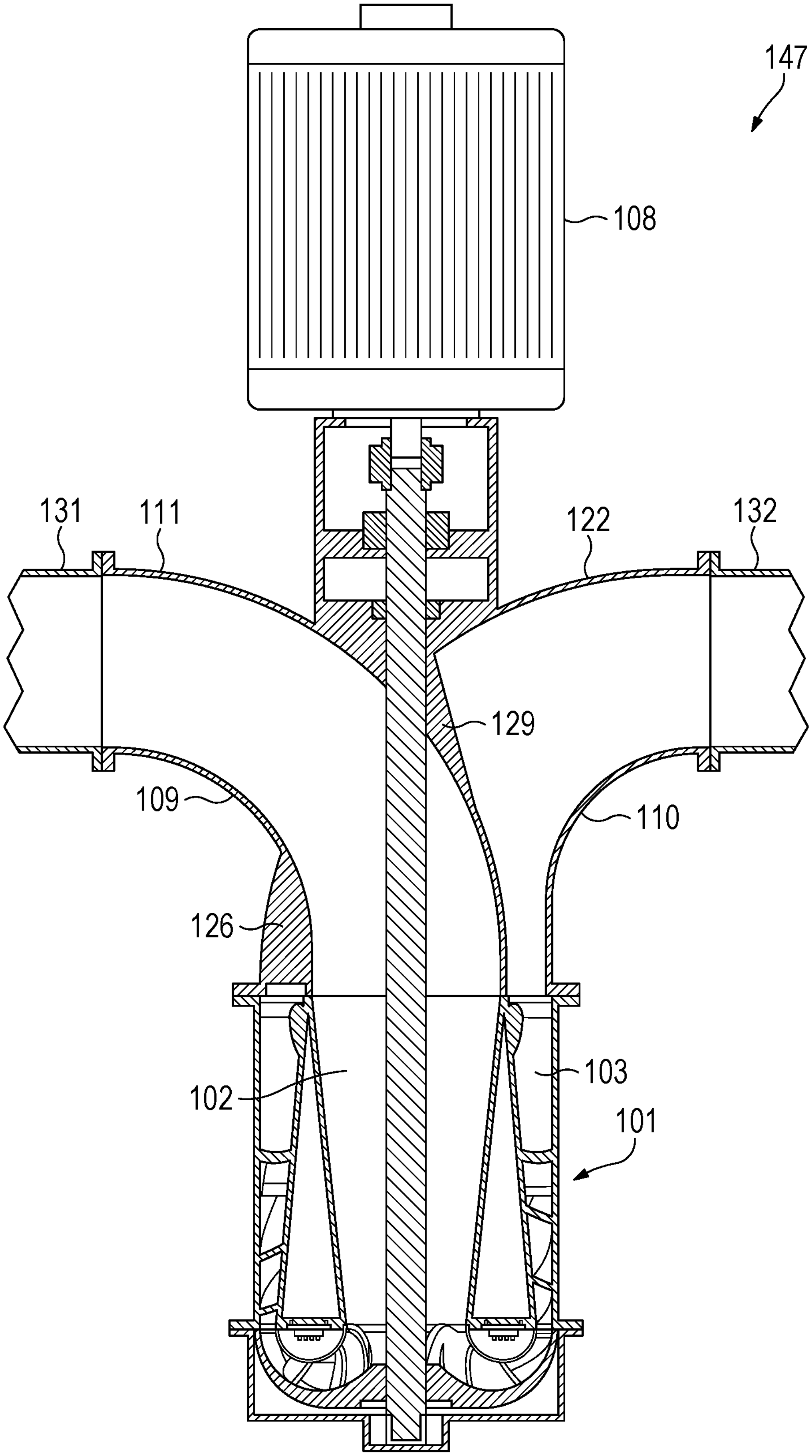
FIG. 34 is a sectional view of a fluid connection according to an example configuration suitable for, for example, use as an in-line pump.

Turning briefly to FIG. 34, FIG. 34 illustrates how an example of a fluid connection 100 might be coupled to an example pump 101. As illustrated, the first end 111 of the first duct 109 is coupled to an inlet conduit 131, and the first end 122 of the second duct 110 is coupled to an outlet conduit 132. The second end 112 of the first duct 109 is coupled to the pump inlet 102 of the pump 101, while the annular second end 123 of the second duct 110 is coupled to the pump outlet 103 of the pump 101. Accordingly, the first duct 109 may be described as being the pump inlet duct, while the second duct 110 may be described as being the pump discharge duct. Again, for simplicity the terminology here is in relation to a pump or the pump mode of a reversible pump-turbine.

Figure 15:
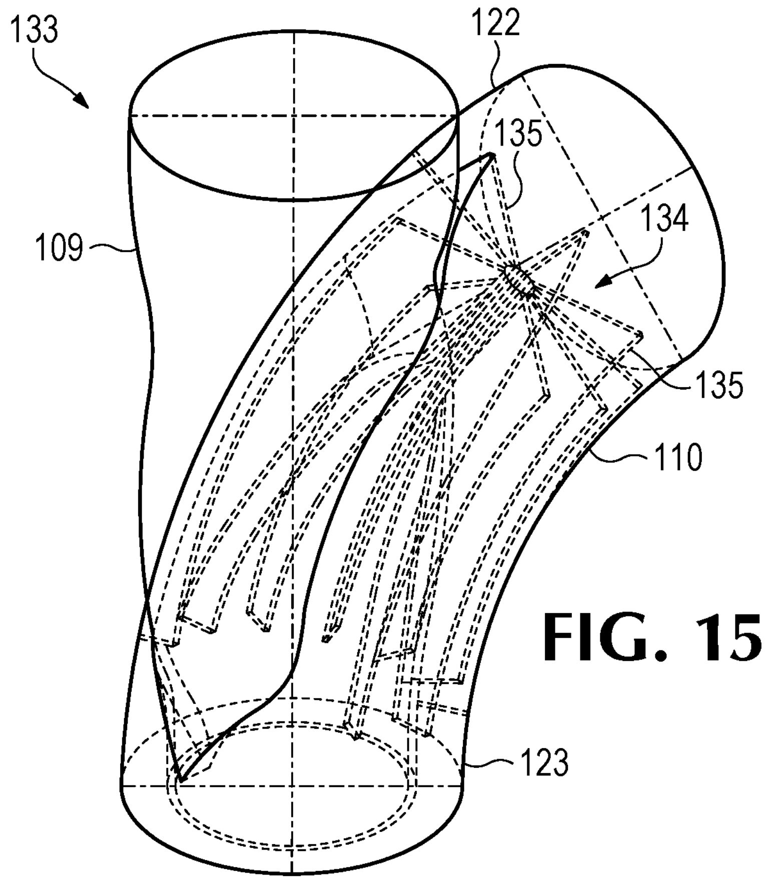
FIG. 15 is a representation of a fluid connection, such as the fluid connection of FIG. 2, illustrating guide vanes according to an example configuration.

FIG. 15 is a representation of a fluid connection 133, such as the fluid connection 100 of FIGS. 2-14, illustrating guide vanes 135 according to an example configuration. As illustrated in FIG. 15, the fluid connection 133 may include an array of guide vanes 134. Each guide vane 135 of the array of guide vanes 134 is a blade that extends substantially radially between the wall of the first duct 109 (the wall being indicated by the reference number 109 in FIG. 15) and the outer wall of the second duct 110 (the outer wall being indicated by the reference number 110 in FIG. 15). As used in this context, "substantially radially" means largely or essentially extending along a radius of the second duct 110, without requiring perfect radiality. In configurations, the array of guide vanes 134 may extend from the first end 122 of the second duct 110 to the second end 123 of the second duct 110. In other configurations, the array of guide vanes 134 may extend only for a portion of the second duct 110 that is less than the full length of the second duct 110. For example, the array of guide vanes 134 may extend only for the middle approximately 80% of the second duct 110, while there are no guide vanes 135 in the approximately 10% of the second duct 110 at the first end 122 of the second duct 110 and the approximately 10% of the second duct 110 at the second end 123 of the second duct 110. An example of such a configuration is illustrated in FIG. 15. The guide vanes 135 as illustrated help prevent flow separation in the second duct 110, thereby reducing hydraulic losses. This contributes to the overall efficiency of the hydromotive machine 101 assembly that is coupled to a fluid connection 133 having an array of guide vanes 134 as described.

Figure 16:
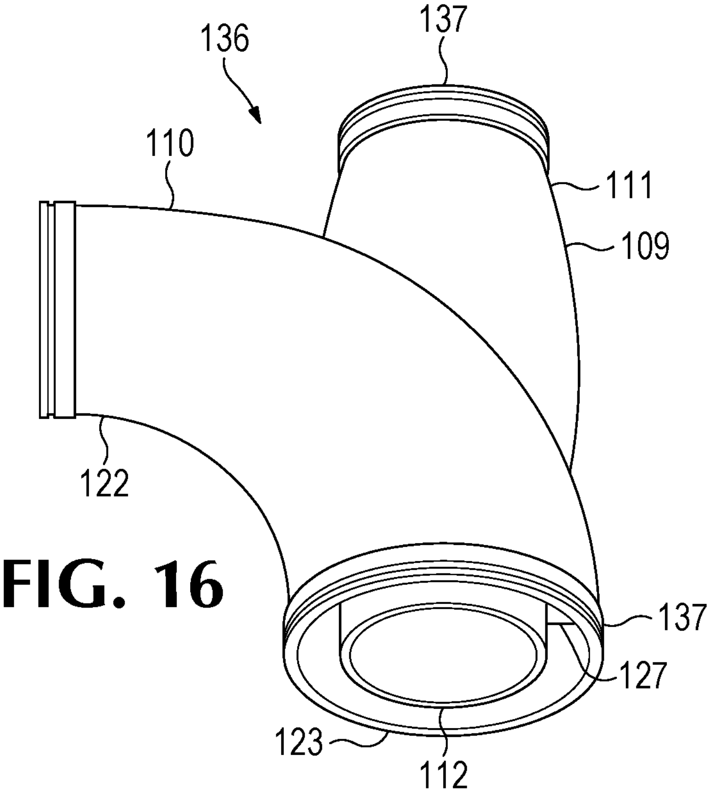
FIG. 16 is a perspective view of a fluid connection according to an example configuration that is similar to the fluid connection of FIG. 2 but has grooved pipe couplings instead of flanges at the ports.
Figure 17:
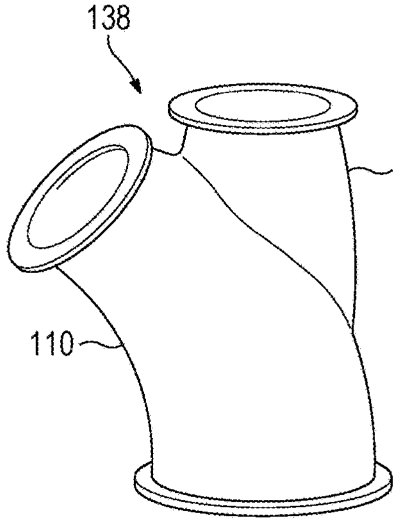
FIG. 17 is a perspective view of a fluid connection according to another example configuration.
Figure 18:
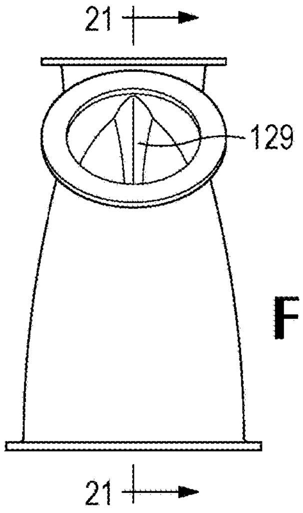
FIG. 18 is a left-side view of the fluid connection of FIG. 17.
Figure 19:
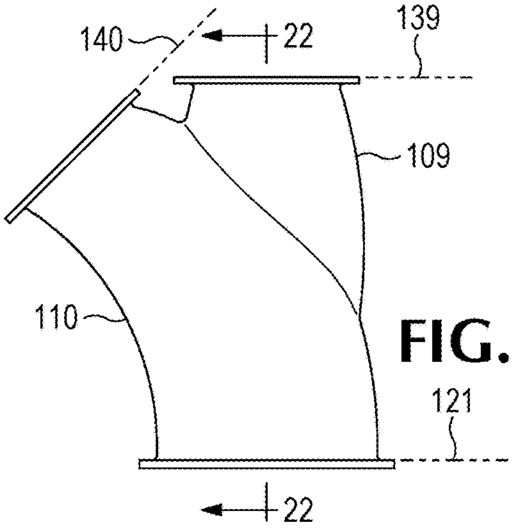
FIG. 19 is a front view of the fluid connection of FIG. 17.
Figure 20:
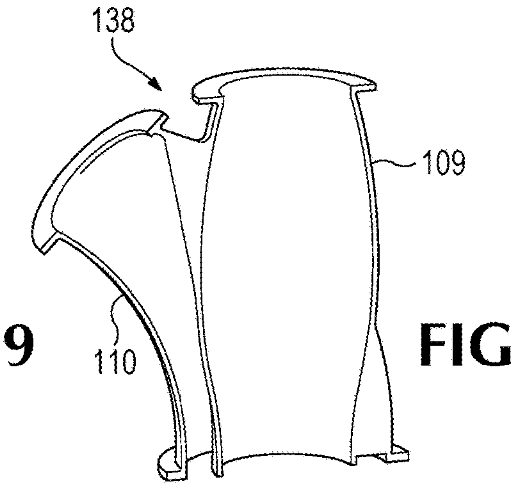
FIG. 20 is a sectional view of the fluid connection of FIG. 17.
Figure 21:
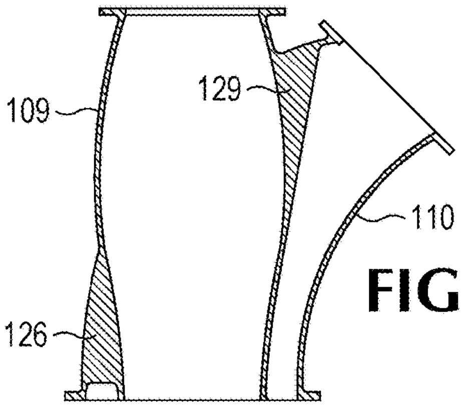
FIG. 21 is a sectional view of the fluid connection of FIG. 17, taken along the line indicated in FIG. 18.
Figure 22:
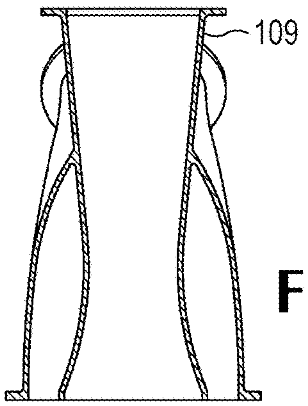
FIG. 22 is a sectional view of the fluid connection of FIG. 17, taken along the line indicated in FIG. 19.
Figure 23:
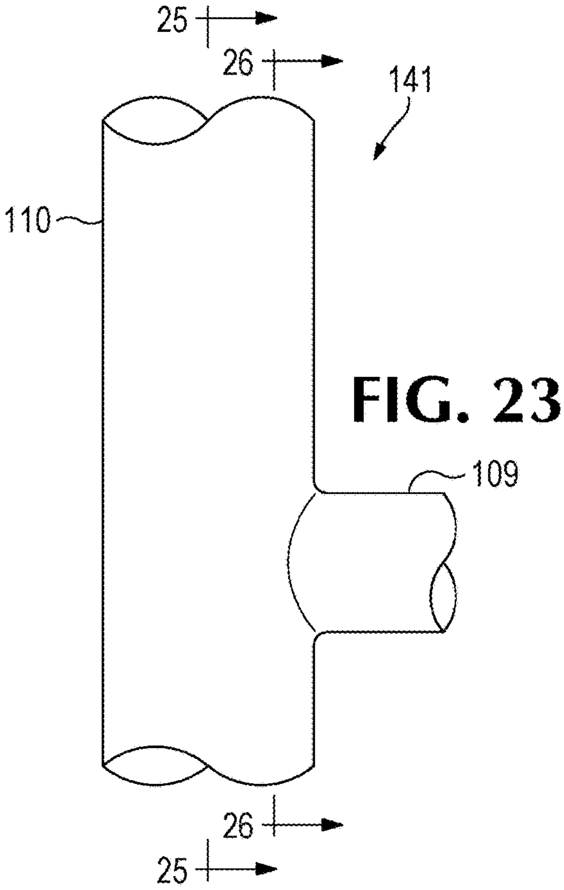
FIG. 23 is a perspective view of a fluid connection according to another example configuration.
Figure 24:
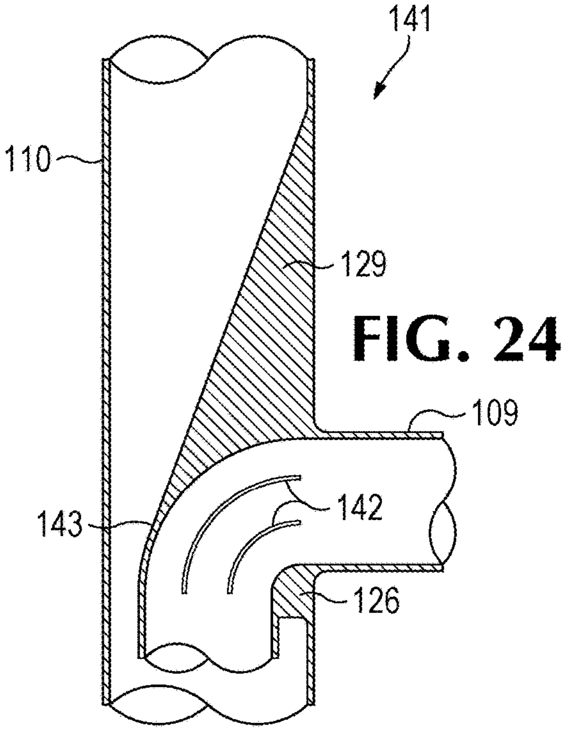
FIG. 24 is a sectional view of the fluid connection of FIG. 23.
Figure 25:
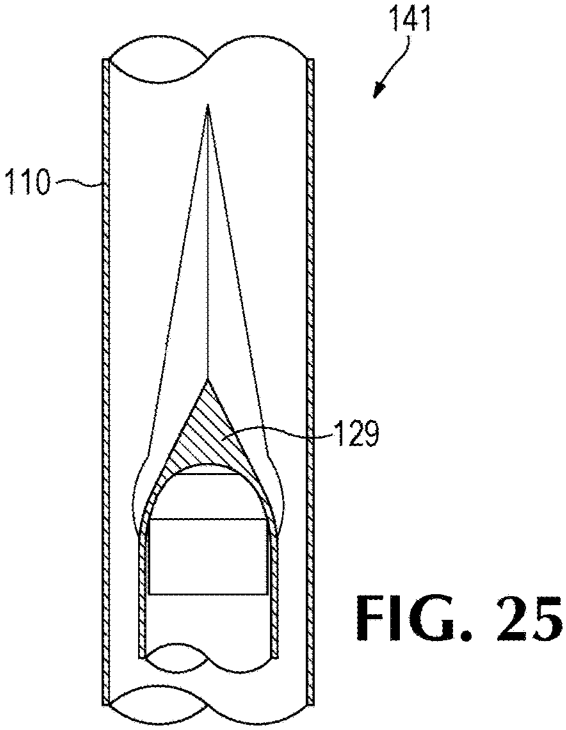
FIG. 25 is a sectional view of the fluid connection of FIG. 23, taken along the line indicated in FIG. 23.
Figure 26:
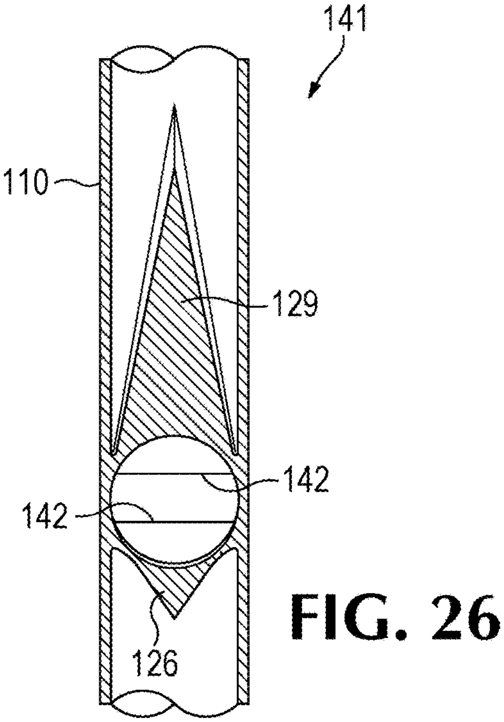
FIG. 26 is a sectional view of the fluid connection of FIG. 23, taken along the line indicated in FIG. 23.
Figure 27:
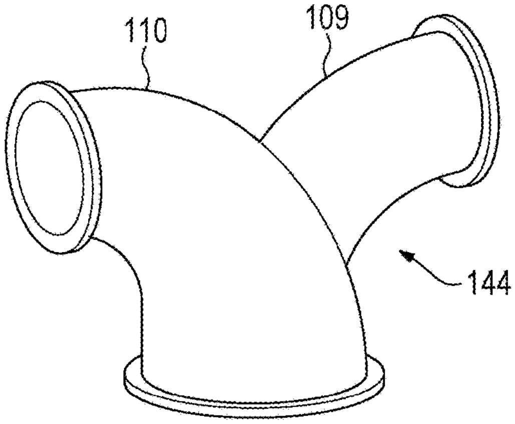
FIG. 27 is a perspective view of a fluid connection according to another example configuration.
Figure 28:
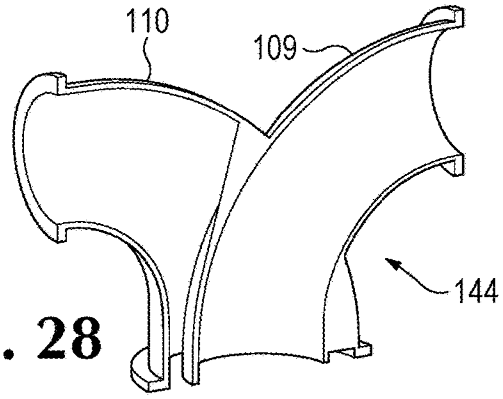
FIG. 28 is a sectional view of the fluid connection of FIG. 27.
Figure 29:
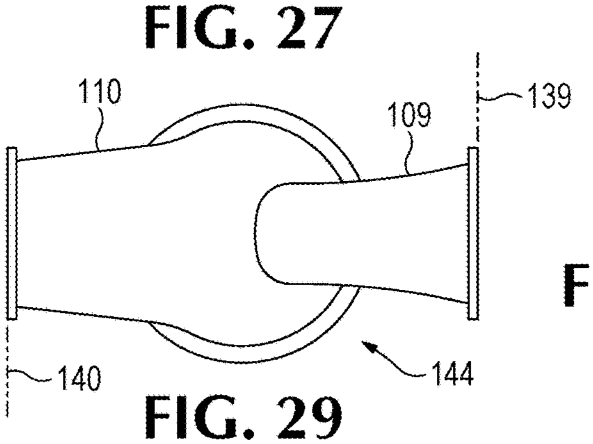
FIG. 29 is 35*a* top view of the fluid connection of FIG. 27.
Figure 30:
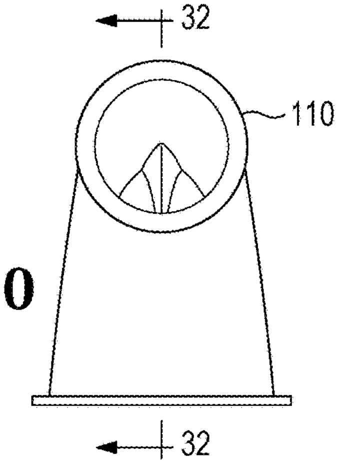
FIG. 30 is a left-side view of the fluid connection of FIG. 27.
Figure 31:
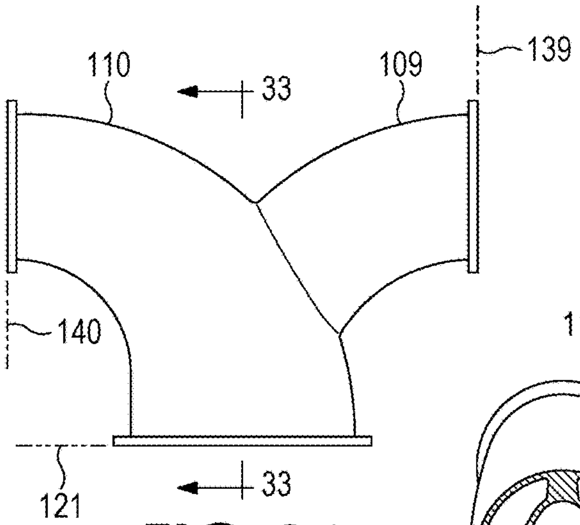
FIG. 31 is a front view of the fluid connection of FIG. 27.
Figure 32:
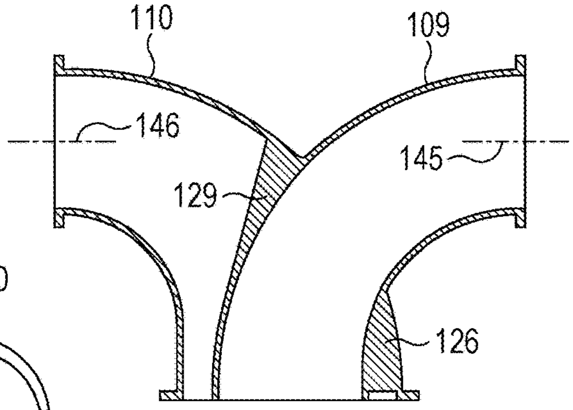
FIG. 32 is a sectional view of the fluid connection of FIG. 27, taken along the line indicated in FIG. 30.
Figure 33:
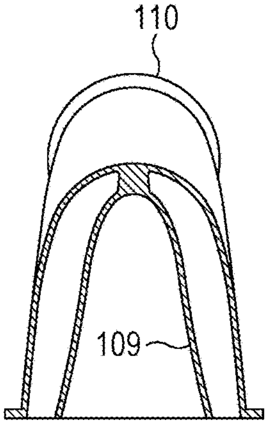
FIG. 33 is a sectional view of the fluid connection of FIG. 27, taken along the line indicated in FIG. 31.

FIG. 16 is a perspective view of a fluid connection 136 according to an example configuration having grooved pipe couplings 137 instead of flanges 124 at each of the first end 111 of the first duct 109, the first end 122 of the second duct 110, and the second end 123 of the second duct 110. Otherwise, the fluid connection 136 of FIG. 16 is substantially the same as the fluid connection 100 of FIGS. 2-14, and configurations of the fluid connection 136 of FIG. 16 may include the array of guide vanes 134 discussed with respect to FIG. 15.

FIGS. 17-22 show various views of aspects of a fluid connection 138 for a hydromotive machine 101, according to an example configuration. The views are as described above in the Brief Description of the Drawings section. The fluid connection 138 of FIGS. 17-22 is substantially the same as the fluid connection 100 of FIGS. 2-14 except as noted here. And configurations of the fluid connection 138 of FIGS. 17-22 may include the array of guide vanes 134 discussed with respect to FIG. 15 and may include the grooved pipe couplings 137 of FIG. 16. As described more fully below, the difference between the fluid connection 138 of FIGS. 17-22 and the fluid connection 100 of FIGS. 2-14 is in the angle of the first end 122 of the second duct 110.

Specifically, a plane 139 is defined by the first end 111 of the first duct 109, another plane 140 is defined by the first end 122 of the second duct 110, and still another plane 121 is defined by the second end 123 of the second duct 110. In the configuration illustrated in FIGS. 2-14, the plane 139 of the first end 111 of the first duct 109 is substantially parallel to the plane 121 of the second end 123 of the second duct 110, and each of those planes is substantially perpendicular to the plane 140 of the first end 122 of the second duct 110. As used in this disclosure, "substantially parallel" means largely or essentially equidistant at all points, without requiring perfect parallelism. By contrast, in the configuration illustrated in FIGS. 17-22, the plane 140 of the first end 122 of the second duct 110 is not substantially perpendicular to the plane 139 of the first end 111 of the first duct 109 or to the plane 121 of the second end 123 of the second duct 110. Instead, the plane 140 of the first end 122 of the second duct 110 is at about 45° to the plane 121 of the second end 123 of the second duct 110. Even so, the 45° angle is just a typical example and other angles could also be used. In other words, the basic topology of the fluid connection can be adapted to various angles between the pump axis of rotation, the pump inlet duct, and the pump discharge ducts.

FIGS. 23-26 show various views of aspects of a fluid connection 141 for a hydromotive machine 101, according to an example configuration. The views are as described above in the Brief Description of the Drawings section. The fluid connection 141 of FIGS. 23-26 is substantially the same as the fluid connection 100 of FIGS. 2-14 except as noted here, and configurations of the fluid connection 141 of FIGS. 23-26 may include the array of guide vanes 134 discussed with respect to FIG. 15 and may include the grooved pipe couplings 137 of FIG. 16. The fluid connection 141 of FIGS. 23-26 may be useful for, as an example, a side outlet from a well at the second end 123 of the second duct 110.

The fluid connection 141 of FIGS. 23-26 differs from the fluid connection 100 of FIGS. 2-14 in the following ways. In the fluid connection 141 of FIGS. 23-26, the plane 140 of the first end 122 of the second duct 110 and the plane 121 of the second end 123 of the second duct 110 are parallel and the ends themselves are coaxial, while the plane 139 of the first end 111 of the first duct 109 is substantially perpendicular to the plane 140 of the first end 122 of the second duct 110 and to the plane 121 of the second end 123 of the second duct 110. Also, in the fluid connection 141 of FIGS. 23-26, the first duct 109 lacks the mid-portion 113 having a non-circular cross-section. Instead, the first duct 109 has a circular cross-section throughout. The fluid connection 141 of FIGS. 23-26 may include the first fairing 126 within the second duct 110 or the second fairing 129 within the second duct 110, or both the first fairing 126 and the second fairing 129. Each of the first fairing 126 and the second fairing 129 are as described above for FIGS. 2-14. In configurations, first-duct guide vanes 142 may be used to reduce losses in the elbow 143 of the first duct 109.

FIGS. 27-33 show various views of aspects of a fluid connection 144 for a hydromotive machine 101, according to an example configuration. The views are as described above in the Brief Description of the Drawings section. The fluid connection 144 of FIGS. 27-33 is substantially the same as the fluid connection 100 of FIGS. 2-14 except as noted here, and configurations of the fluid connection 144 of FIGS. 27-33 may include the array of guide vanes 134 discussed with respect to FIG. 15 and may include the grooved pipe couplings 137 of FIG. 16.

The difference between the fluid connection 144 of FIGS. 27-33 and the fluid connection 100 of FIGS. 2-14 is in the angle of the first end 111 of the first duct 109. Specifically, the plane 139 of the first end 111 of the first duct 109 is substantially perpendicular to the plane 121 of the second end 123 of the second duct 110. The plane 139 of the first end 111 of the first duct 109 is also substantially parallel to the plane 140 of the first end 122 of the second duct 110. And the first end 111 of the first duct 109 is coaxial with the first end 122 of the second duct 110.

Stated another way, each of the first end 111 of the first duct 109 and the first end 122 of the second duct 110 have a cross-sectional area and a centerline that passes through a midpoint of the cross-sectional area and is perpendicular to the cross-sectional area. The centerline 145 of the first end 111 of the first duct 109 and the centerline 146 of the first end 122 of the second duct 110 are collinear.

FIG. 34 is a sectional view of a fluid connection according to an example configuration suitable for, for example, use as an in-line pump. As illustrated in FIG. 34, an in-line pump assembly 147 may include the fluid connection 144 of FIGS. 27-33 and a pump 101 operated by an electric motor 108. The motor operates the pump 101 as explained above for FIG. 1. Also, as noted above, the first end 111 of the first duct 109 is coupled to an inlet conduit 131, and the first end 122 of the second duct 110 is coupled to an outlet conduit 132. The second end 112 of the first duct 109 is coupled to the pump inlet 102 of the pump 101, while the annular second end 123 of the second duct 110 is coupled to the pump outlet 103 of the pump 101. As illustrated in FIG. 34, the first end 111 of the first duct 109 is in line with the first end 122 of the second duct 110, thereby allowing the inlet conduit 131 to be in line with the outlet conduit 132. As noted elsewhere in this disclosure, although this discussion of FIG. 34 refers to a pump, in configurations another type of hydromotive machine 101 could be used in place of the pump.

Figure 35:
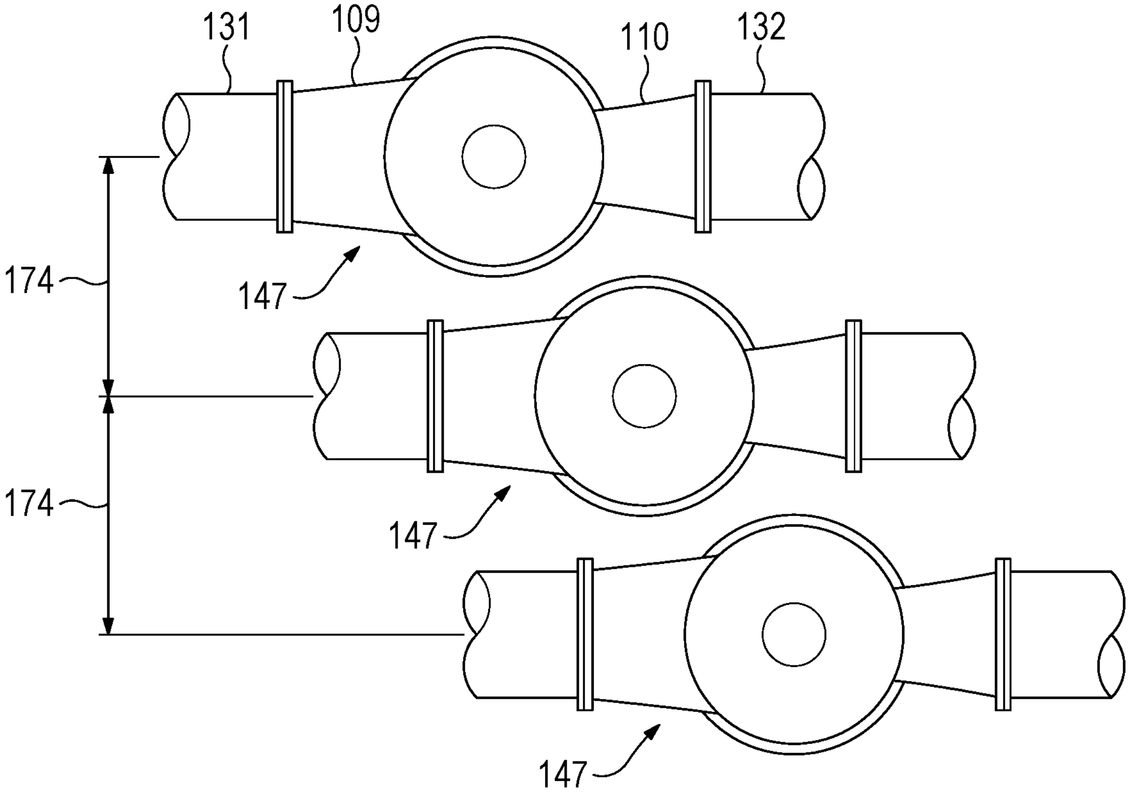
FIG. 35 is a representation of a top view of three in-line pump assemblies, such as the example configuration of FIG. 34.
Figure 36:
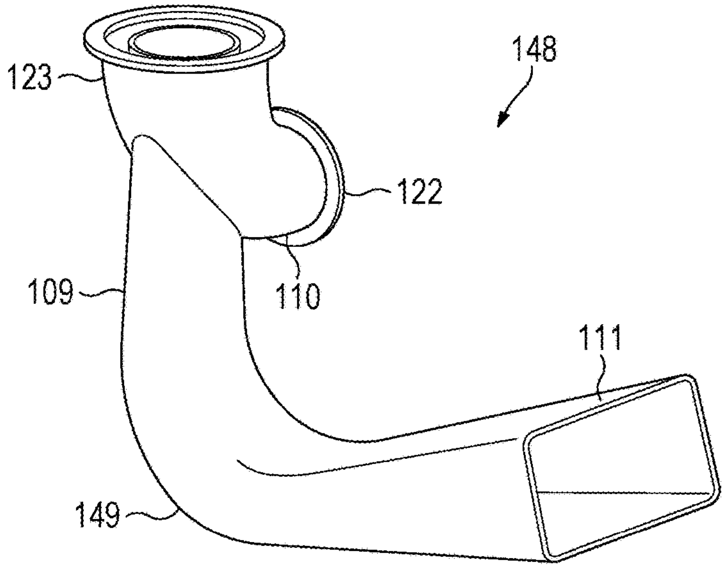
FIG. 36 is a perspective view of a fluid connection according to another example configuration.
Figure 37:
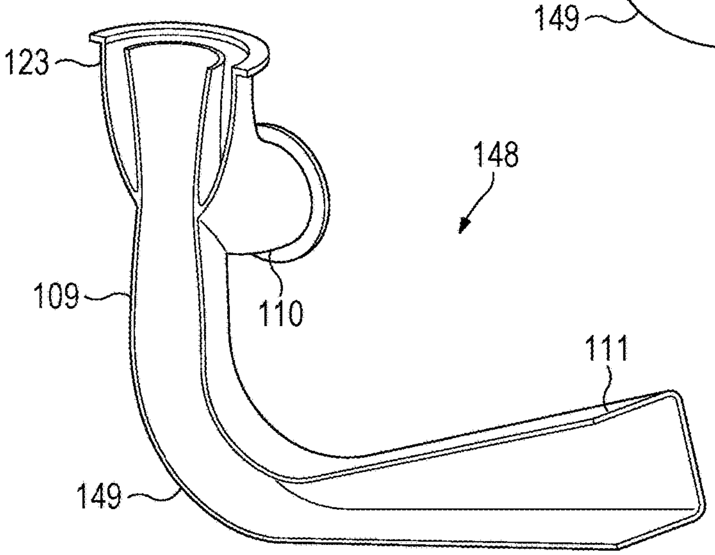
FIG. 37 is a sectional view of the fluid connection of FIG. 36.
Figure 38:
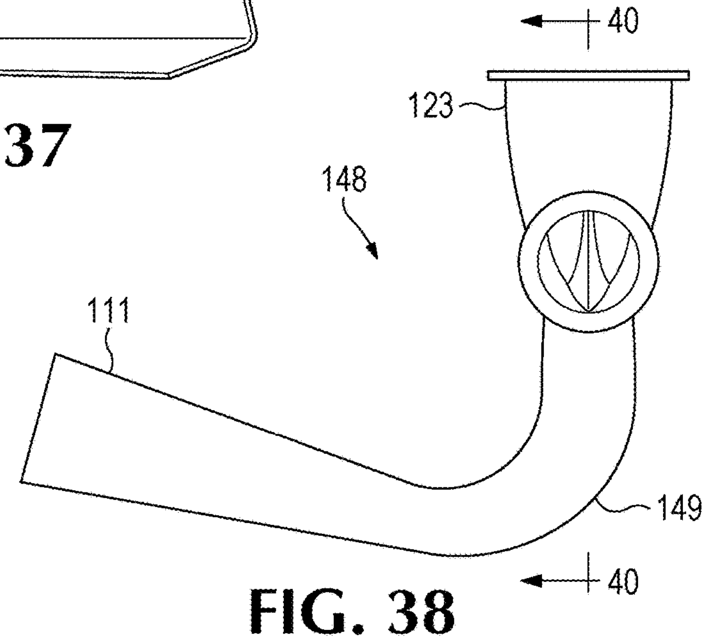
FIG. 38 is a rear view of the fluid connection of FIG. 36.
Figure 39:
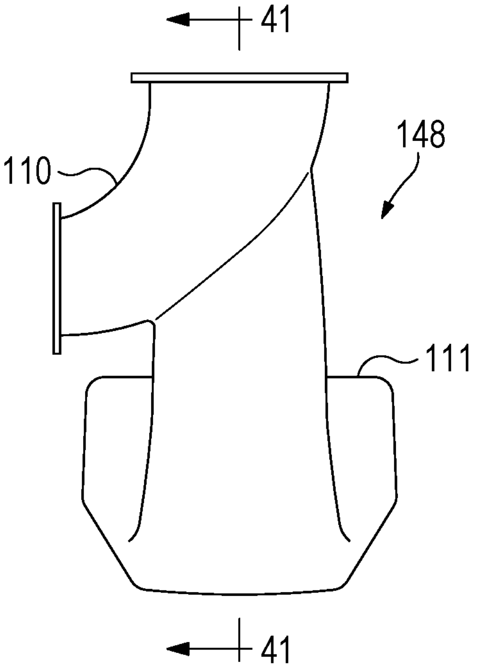
FIG. 39 is a left-side view of the fluid connection of FIG. 36.
Figure 40:
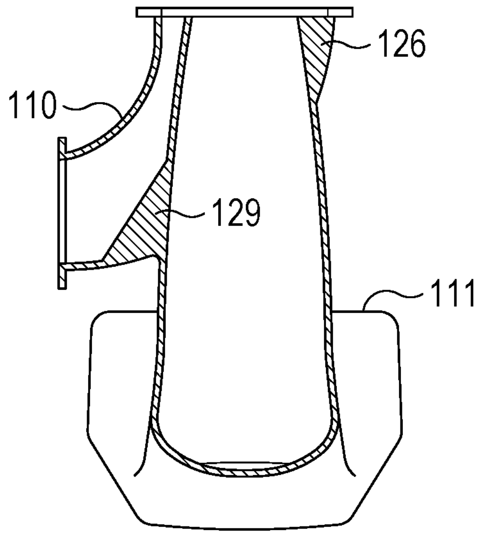
FIG. 40 is a sectional view of the fluid connection of FIG. 36, taken along the line indicated in FIG. 38.
Figure 41:
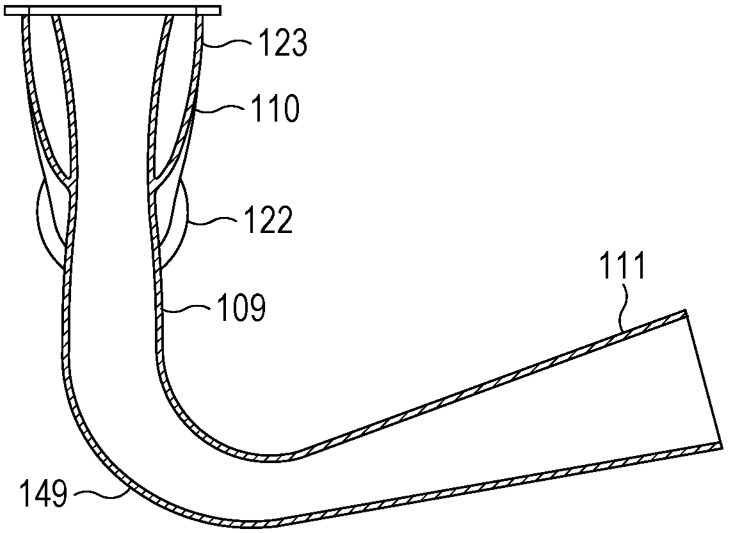
FIG. 41 is a sectional view of the fluid connection of FIG. 36, taken along the line indicated in FIG. 39.
Figure 60:
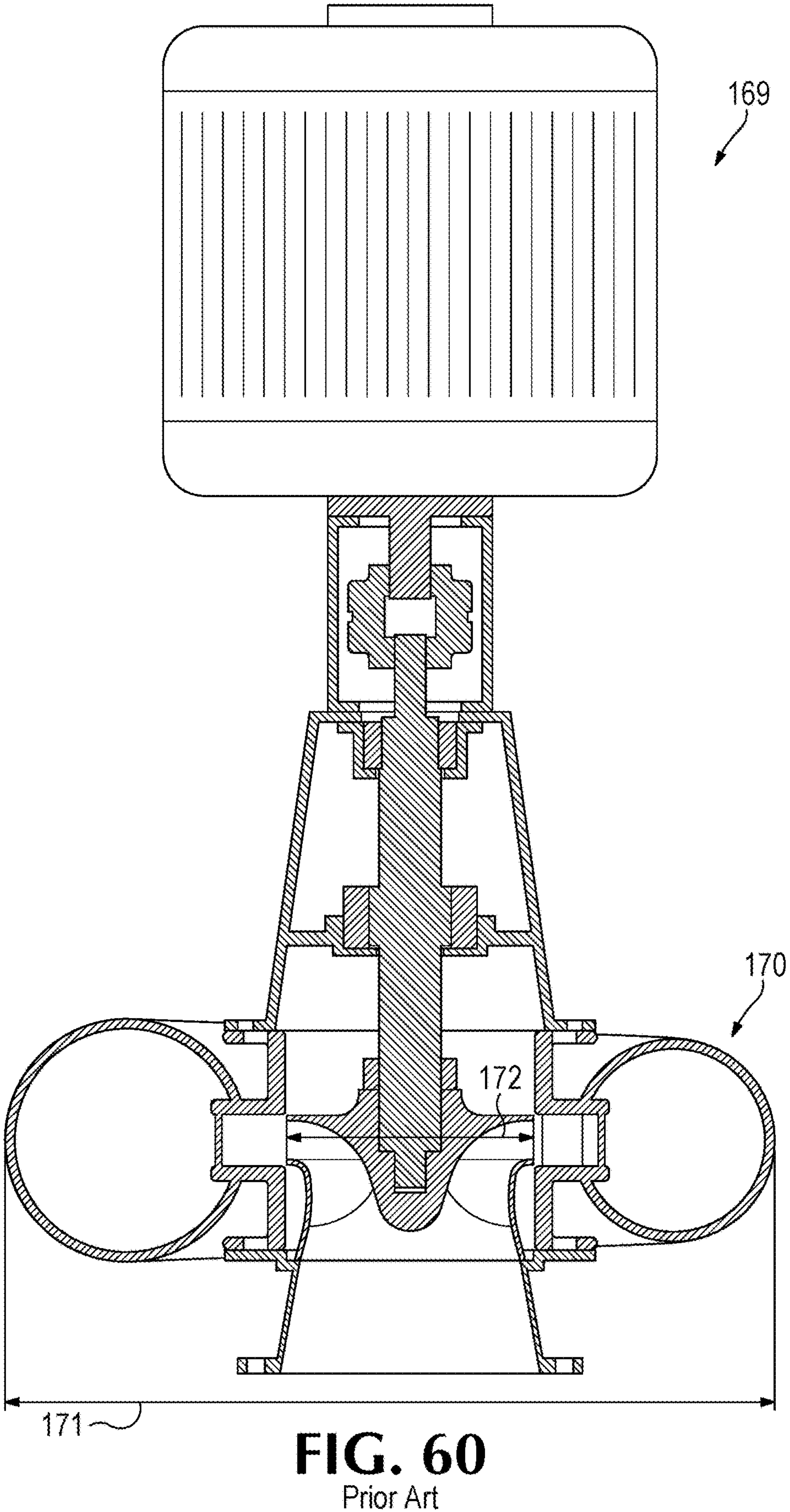
FIG. 60 Prior Art
FIG. 60 shows an example of a conventional pump having a conventional volute diffuser.
Figure 61:
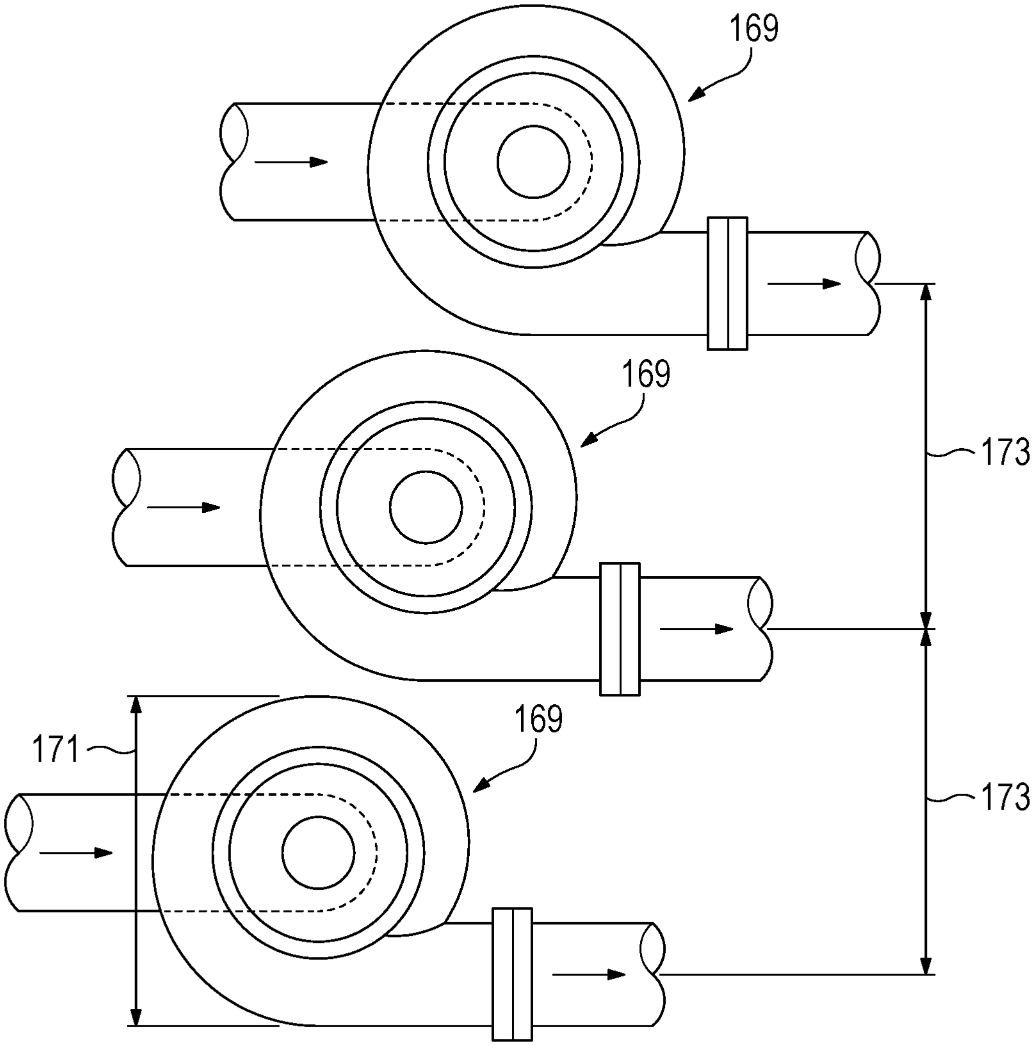
FIG. 61 Prior Art
FIG. 61 illustrates a collection of conventional pumps.

FIG. 35 is a representation of a top view of three in-line pump assemblies, such as the example configuration of FIG. 34. As illustrated in FIG. 35, in-line pump assemblies of the type illustrated in FIG. 34 can be placed relatively close together to save installation space when compared to installations having pumps with scroll cases. The disclosed technology provides at least two important advantages over conventional scroll cases and mixed-flow pumps in such an in-line application. Firstly, the axial diffuser provides precise control over pressure gradients within the diffuser and thus facilitates promoting laminar flow within the diffuser. Secondly, the fact that no part of the pump or fluid connection need be much larger in diameter than the toroidal impeller itself allows multiple units to be closely spaced, as illustrated by the minimal spacing 174 indicated in FIG. 35, when compared to the required spacing of pumps with volute diffusers. (See FIGS. 60 and 61 and the discussion in the Background section.) The reduced spacing between pumps saves installation space, which is often limited and expensive, such as in the case of pumps installed shipboard or in underground vaults. The cost of space, weight, and power (to overcome inefficiencies) becomes even higher in the case of pumps incorporated into aircraft and spacecraft. Accordingly, the weight and size benefits of the disclosed technology become even greater in the case of aircraft-, spacecraft-, and rocket-borne pumps.

FIGS. 36-41 show various views of aspects of a fluid connection 148 for a hydromotive machine 101, according to an example configuration. The views are as described above in the Brief Description of the Drawings section. The fluid connection 148 of FIGS. 36-41 is substantially the same as the fluid connection 100 of FIGS. 2-14 except as noted here, and configurations of the fluid connection 148 of FIGS. 36-41 may include the array of guide vanes 134 discussed with respect to FIG. 15 and may include the grooved pipe couplings 137 of FIG. 16.

The difference between the fluid connection 148 of FIGS. 36-41 and the fluid connection 100 of FIGS. 2-14 is that the mid-portion 113 of the first duct 109 extends to an elbow 149 that is wholly external to the second duct 110. The elbow 149 may be at an angle of about 90°, although the elbow 149 could be at other angles, too. Also, the cross-sectional area of the first duct 109 gradually increases, or flares out, from the elbow 149 to the first end 111 of the first duct 109. Accordingly, the first duct 109 is suitable for use as an elbow draft tube. As illustrated in FIGS. 36-41, the gradually increasing cross-sectional area is substantially rectangular. As used in this disclosure, "substantially rectangular" means largely or essentially shaped like a rectangle or a square.

Figure 42:
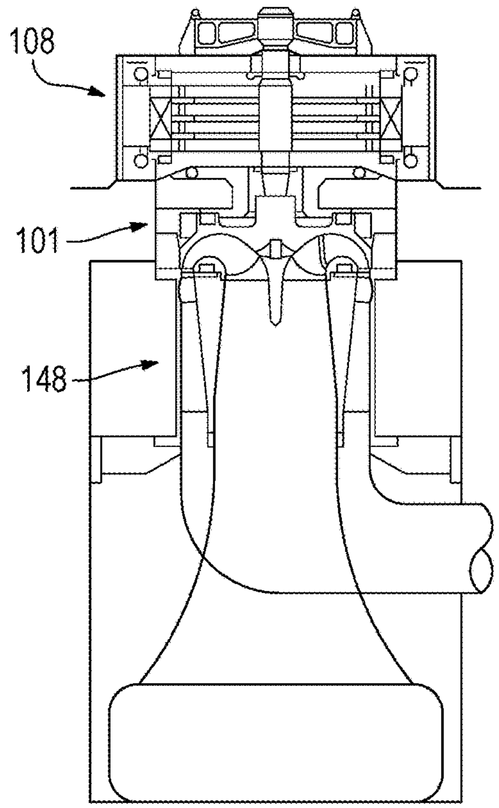
FIG. 42 is a representation of an example fluid connection, such as the fluid connection of FIG. 36, in an example installation.
Figure 43:
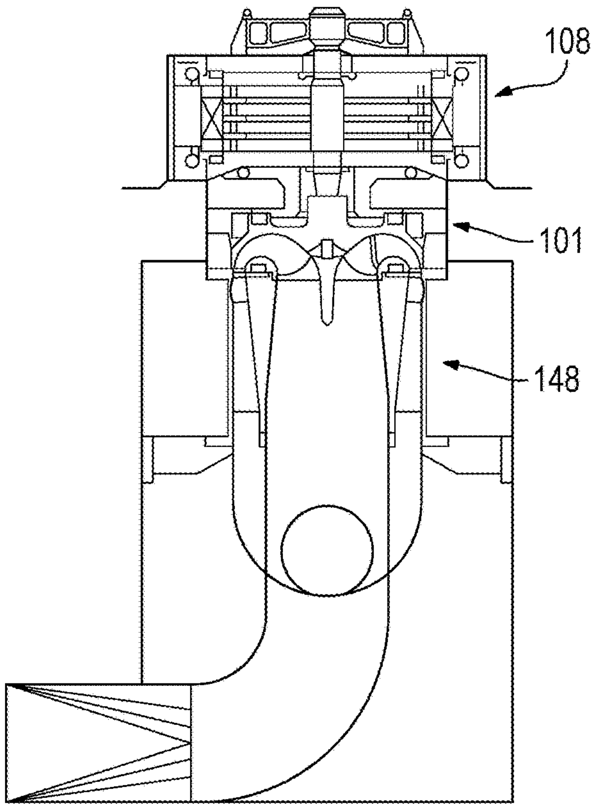
FIG. 43 is a side view of the example installation of FIG. 42.

FIG. 42 is a representation of an example fluid connection, such as the fluid connection 148 of FIGS. 36-41, in an example installation. FIG. 43 is a side view of the example installation of FIG. 42. As illustrated in FIGS. 42-43, an installation using a fluid connection with elbow draft tube may include the fluid connection 148 with elbow draft tube of FIGS. 36-41 and a reversible pump-turbine 101 powered by an electric motor 108. As discussed above for FIG. 1, the reversible pump-turbine 101 includes toroidal impellers 104 that (in pump mode) increase the velocity of the fluid and divert the fluid 180 degrees from the direction of flow through the pump inlet 102 (see FIGS. 1 and 34). In turbine mode, the toroidal impellers 104 function as a toroidal runner, turning energy from the moving fluid into kinetic energy of the runner.

Figure 44:
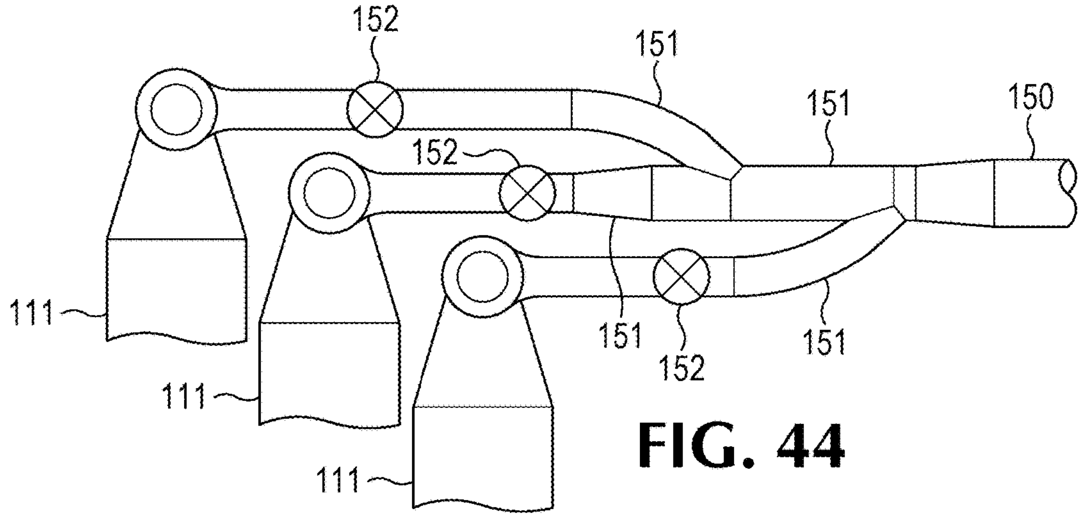
FIG. 44 is a top view of three units of the example installation of FIG. 42, illustrating an example connection between the several units.
Figure 45:
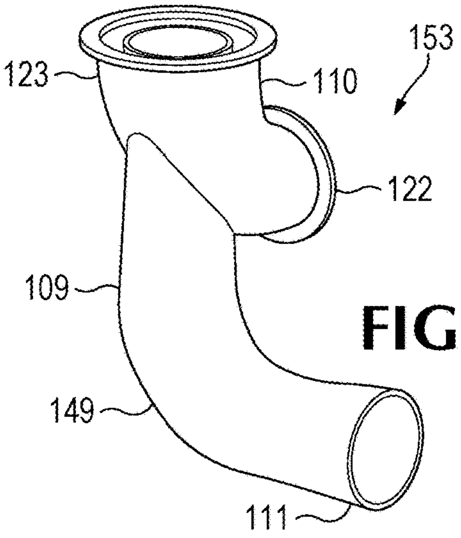
FIG. 45 is a perspective view of a fluid connection according to another example configuration.
Figure 46:
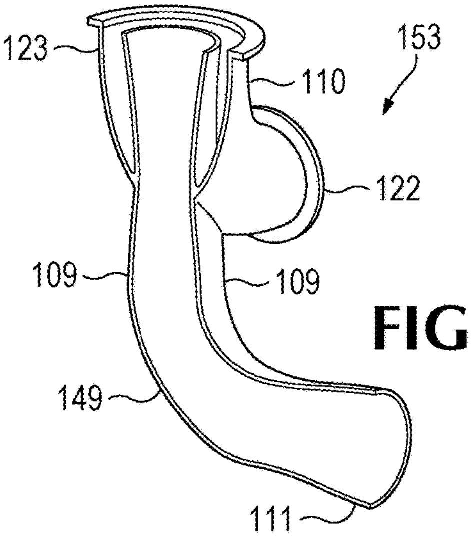
FIG. 46 is a sectional view of the fluid connection of FIG. 45.
Figure 47:
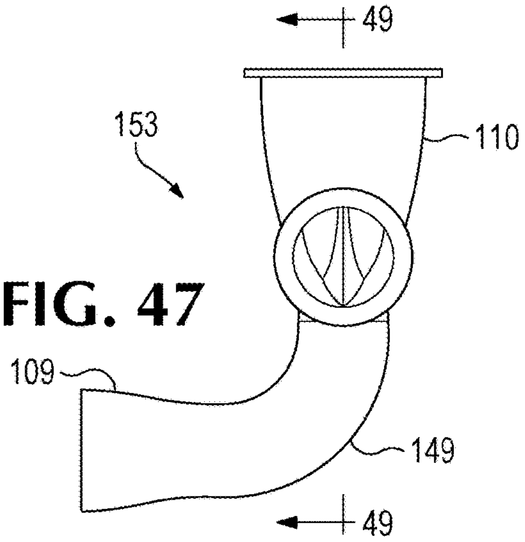
FIG. 47 is a rear view of the fluid connection of FIG. 45.
Figure 48:
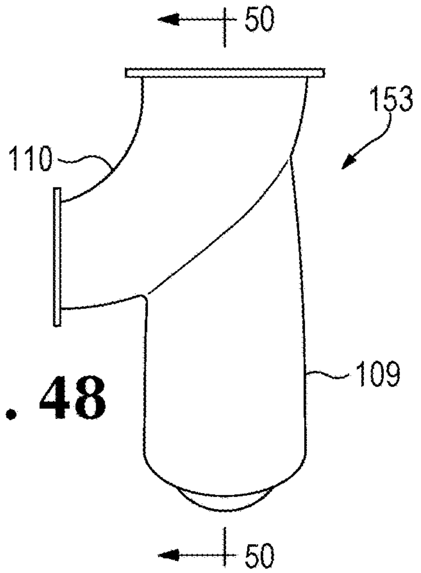
FIG. 48 is a left-side view of the fluid connection of FIG. 45.
Figure 49:
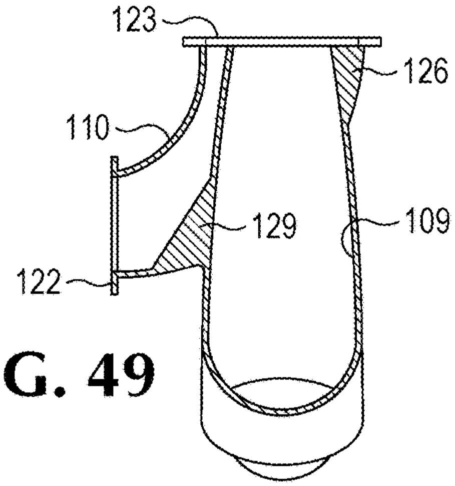
FIG. 49 is a sectional view of the fluid connection of FIG. 45, taken along the line indicated in FIG. 47.
Figure 50:
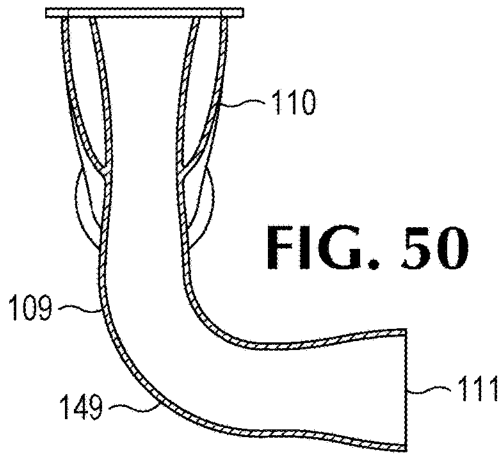
FIG. 50 is a sectional view of the fluid connection of FIG. 45, taken along the line indicated in FIG. 48.

FIG. 44 is a top view of three units of the example installation of FIGS. 42 and 43, illustrating an example connection between the several units. A main penstock 150 may divided into branch connections 151, the flow through which may be controlled by isolation valves 152.

FIGS. 45-50 show various views of aspects of a fluid connection 153 for a hydromotive machine 101, according to an example configuration. The views are as described above in the Brief Description of the Drawings section. The fluid connection 153 of FIGS. 45-50 is substantially the same as the fluid connection 148 of FIGS. 36-41 except that the gradually increasing cross-sectional area of the first duct 109 is substantially circular.

FIG. 51 is a sectional view of an example fluid connection 154 coupled to an example hydromotive machine 101, illustrating angled fairings according to an example configuration. FIG. 52 is a sectional view of the fluid connection 154 of FIG. 51, taken along the line indicated in FIG. 51. As discussed above for FIGS. 2-14, in configurations, the first fairing 126 or the second fairing 129, or both, is not symmetrical about what is otherwise the plane of symmetry 128 of the fluid connection. (See FIG. 3.) For example, as illustrated in FIG. 52, the vertex 130 of the second fairing 129 is just to the right (from the perspective in FIG. 52) of the plane of symmetry 128. As another example, while the vertex 127 the first fairing 126 is on the plane of symmetry 128, the first fairing 126 is thicker on the left side (again, from the perspective in FIG. 52) of the plane of symmetry 128. In each case, then, the fairing is asymmetrical. An objective of some configurations having asymmetric fairings is to better align the pump inlet duct (i.e. the first duct 109) with the flow in the pump outlet 103, which may have some residual tangential velocity downstream of the diffuser vanes 155 of the pump diffuser 105.

Figure 53:
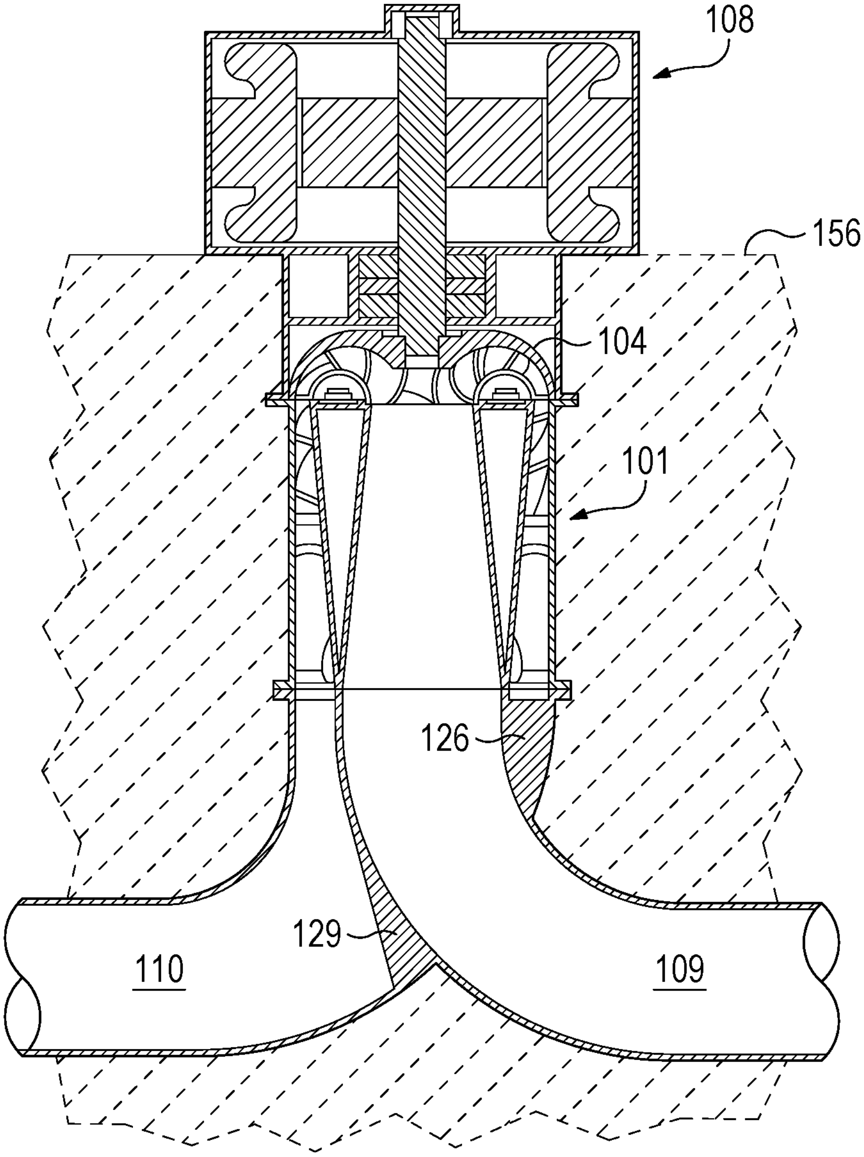
FIG. 53 is a representation of an example fluid connection in an example installation.

FIG. 53 is a representation of an example fluid connection in an example installation where the fluid connection is embedded in a substance 156, such as concrete. Except for being embedded in the substance 156, the implementation of FIG. 53 is substantially the same as the implementation of FIGS. 34, except that the electrical motor is on the opposite side of the fluid connection.

FIGS. 54-57 illustrate how the same fluid connection 100 can be used on pumps 101 having different specific speeds. The fluid connection 100 may be, for example, the fluid connection 100 described above for FIGS. 2-14. The inlets of the pump diffusers 105 for pumps 101 having different specific speeds typically vary in geometry (inner diameter (ID) and outer diameter (OD), for example) while the diffuser discharge ID and OD could be standardized and interchangeable for a given nominal machine flow capacity. In this manner a range of sizes and specific speeds can be more economically manufactured, inventoried, distributed, and serviced.

Figure 54:
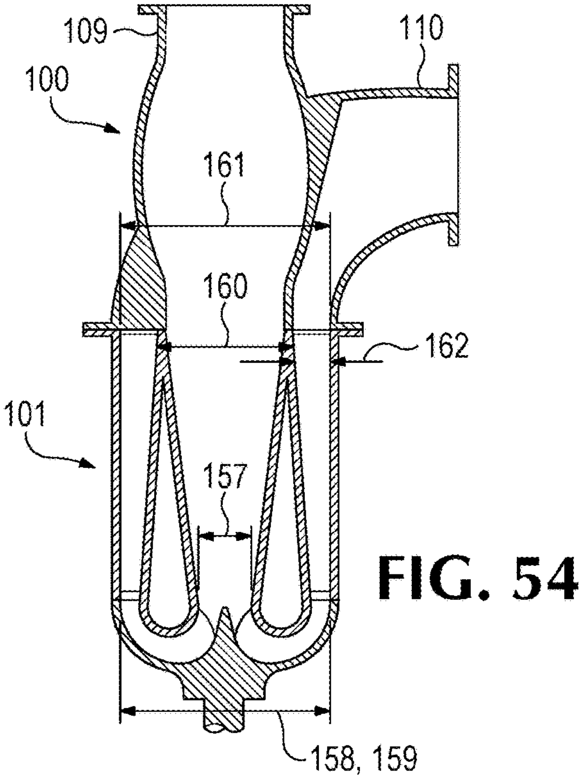
FIGS. 54-57 illustrate how the same fluid connection can be used on pumps having different specific speeds.
Figure 55:
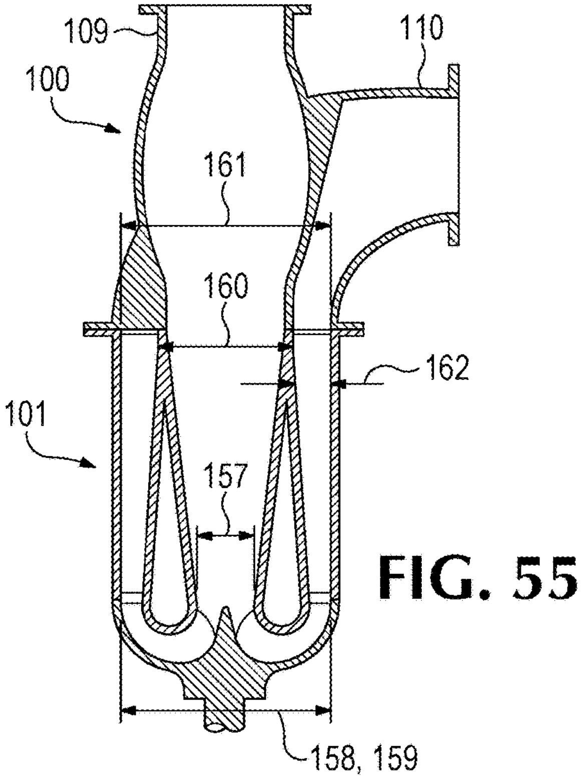
Figure 56:
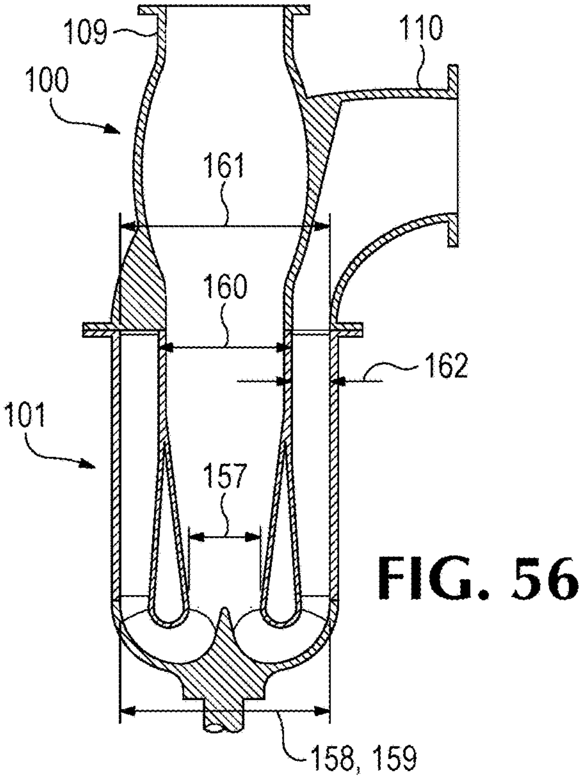
Figure 57:
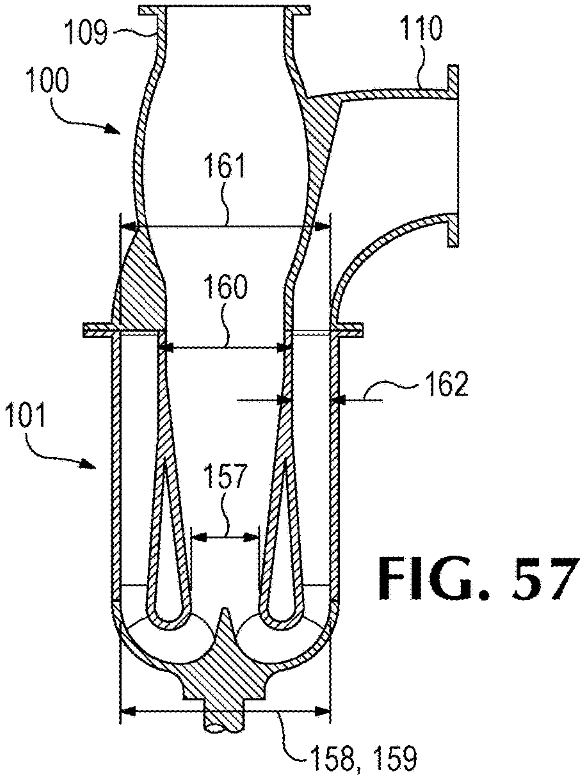

Specifically, the impeller inlet diameters 157 vary from smallest, with the low specific speed design of FIG. 54, to the largest, with the high specific speed design of FIG. 57. Over this specific speed range, the impeller discharge diameters 158 are illustrated at a constant diameter that matches the diffuser inlet outside diameters 159. It should be noted that in accordance with the disclosed technology, and for the impeller discharge diameter selected, the full range of illustrated specific speeds can be accommodated by identical and interchangeable fluid connections. Volute diffusers, by contrast, typically vary in both axial inlet opening height and inlet diameter in order to match the geometry of conventional radial outflow impellers over the same range of specific speeds. By contrast, for a given impeller diameter (given by the impeller discharge diameter in FIGS. 54-57), the inner diameter 160 of the annular pump diffuser 105 is held constant over the range of specific speeds. The annulus passage interface diameter 161 and annulus width 162 is also maintained constant over the range of specific speeds This facilitates changing the diffuser and the impeller to achieve a new specific speed without the need to change the fluid connection 100.

Figure 58:
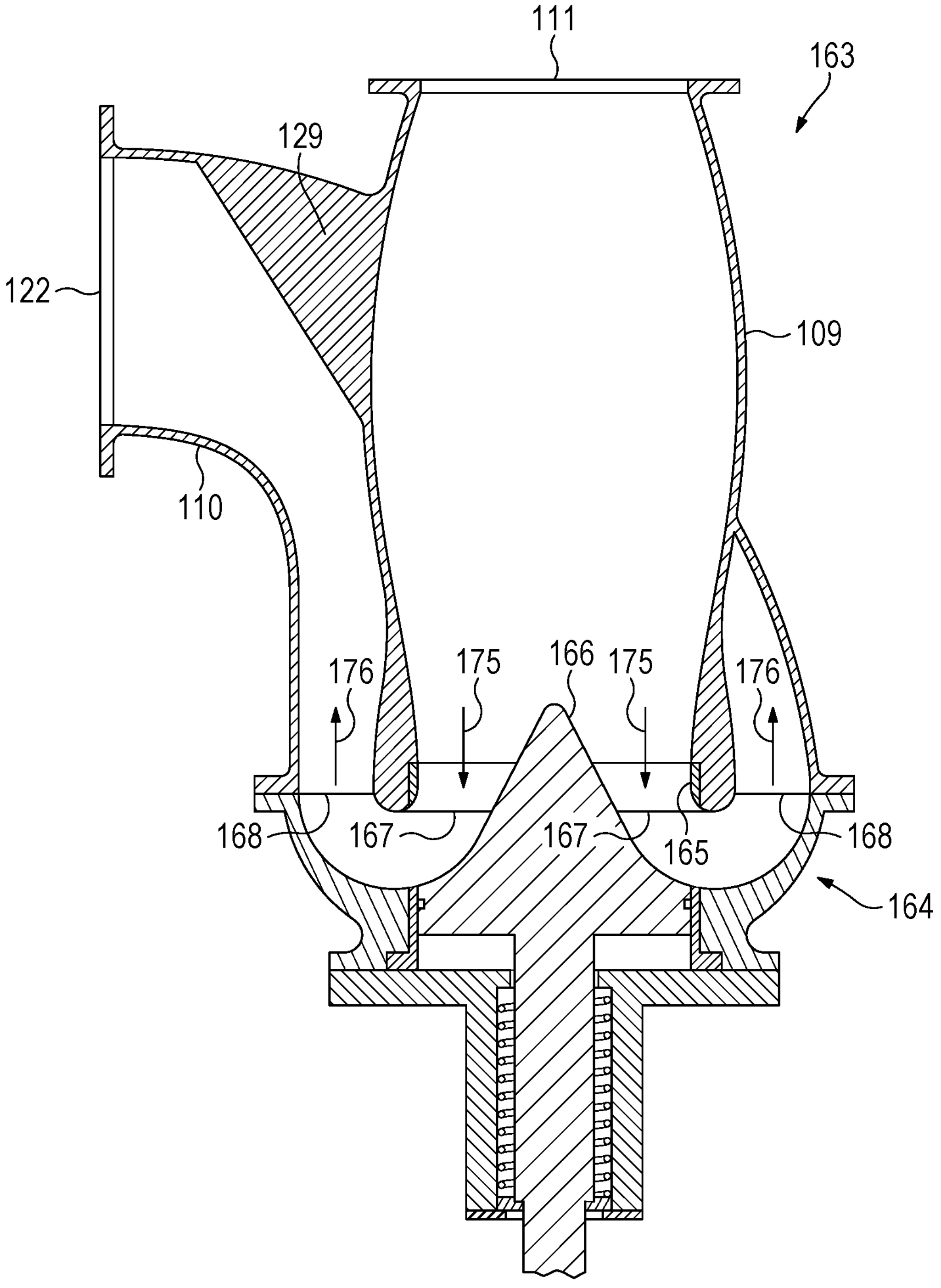
FIG. 58 is a sectional view of a fluid connection according to another example configuration, illustrating an example valve in an open position.
Figure 59:
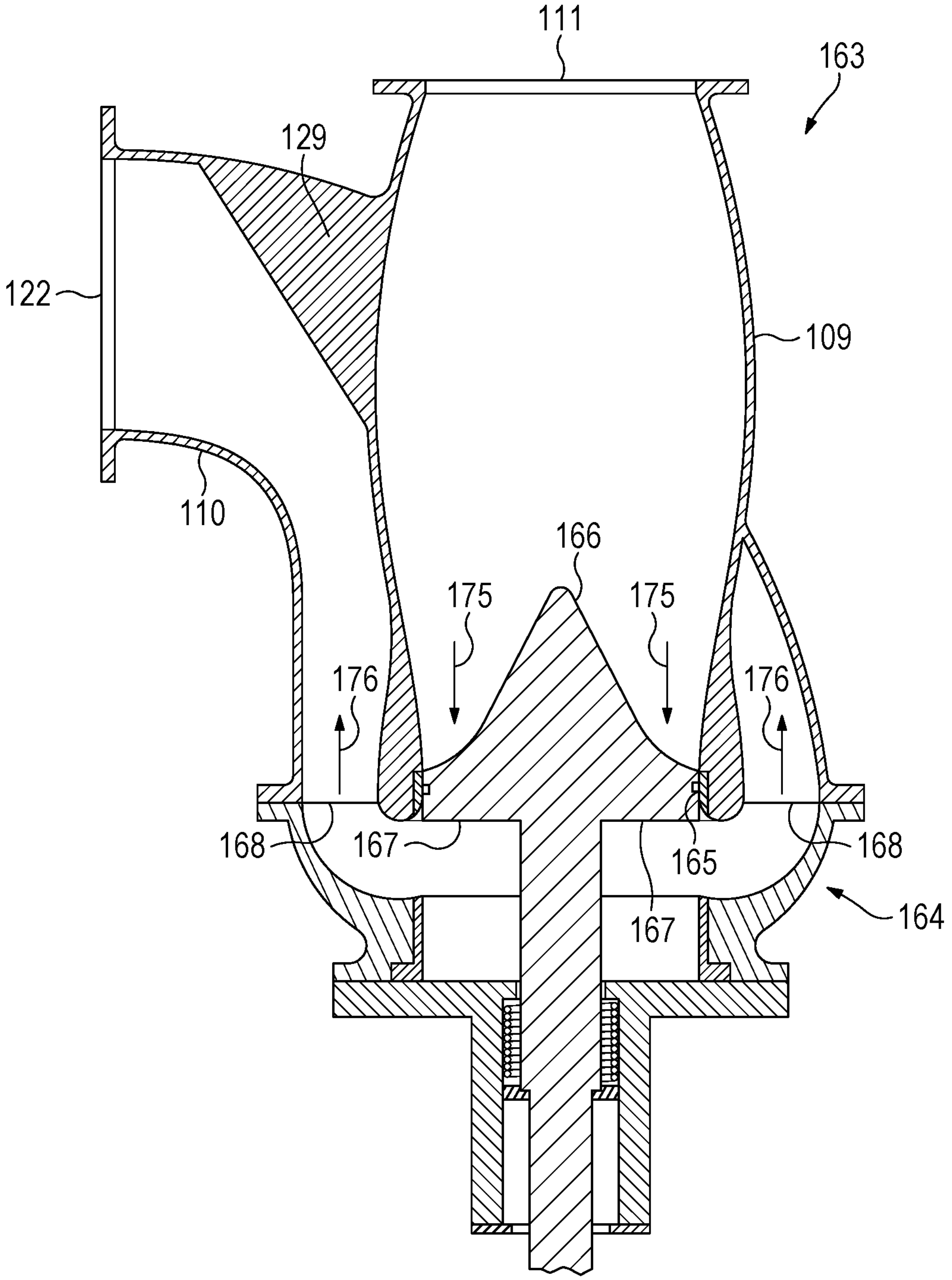
FIG. 59 is a sectional view of the fluid connection of FIG. 58, illustrating the example valve in a closed position.

FIG. 58 is a sectional view of a fluid connection according to another example configuration, illustrating an example valve in an open position. FIG. 59 is a sectional view of the fluid connection of FIG. 58, illustrating the example valve in a closed, or seated, position. The fluid connection 163 of FIGS. 58-59 is substantially the same as the fluid connection 100 of FIGS. 2-14 except as noted here, and configurations of the fluid connection 163 of FIGS. 58-59 may include the array of guide vanes 134 discussed with respect to FIG. 15 and may include the grooved pipe couplings 137 of FIG. 16. Moreover, in addition to the fluid connection 100 of FIGS. 2-14, the fluid connections of FIGS. 17-33 could also be used with a fluid-control valve as explained here for FIGS. 58-59.

The difference between the fluid connection 163 of FIGS. 58-59 and the fluid connection 100 of FIGS. 2-14 is that the fluid connection 163 of FIGS. 58-59 is configured to be used in conjunction with a fluid-control valve 164 rather than in conjunction with a hydromotive machine 101. The direction of flow 175 into the valve inlet 167 of the fluid-control valve 164 is opposite the direction of flow 176 out of the valve outlet 168 of the fluid-control valve 164, and the valve inlet 167 is coaxial with the valve outlet 168. Accordingly, as illustrated in FIGS. 58-59, the fluid connection 163 includes a valve seat 165. When the fluid-control valve 164 is open, an example of which is shown in FIG. 58, a plug 166 of the fluid-control valve 164 is away from the valve seat 165, allowing fluid to flow from the valve inlet 167 to the valve outlet 168 (which are akin to the pump inlet 102 and the pump outlet 103 of FIGS. 2-14). When the fluid-control valve 164 is closed, an example of which is shown in FIG. 59, the plug 166 contacts the valve seat 165, substantially preventing fluid flow from the valve inlet 167 to the valve outlet 168. Although FIGS. 58-59 illustrate a globe valve, other fluid-control valve types could also be used.

The advantages of compactness, reduced weight, minimal pressure drop, maximum flow capacity, and closer permissible spacing discussed above for the fluid connections of FIGS. 2-57 also apply to assemblies using the fluid connection 163 of FIGS. 58-59. Also, the axisymmetric fluid, low-loss passageways enhance the ability of such a valve to regulate flow rate independently of downstream pressure. Valves so equipped can also be used for pressure regulation, pressure relief, mass flow control, shut off, etc.

EXAMPLES

Illustrative examples of the disclosed technologies are provided below. A particular configuration of the technologies may include one or more, and any combination of, the examples described below.

Example 1 includes a fluid connection comprising: a first duct extending from a first end of the first duct to a second end of the first duct, the first duct including a mid-portion between the first end of the first duct and the second end of the first duct that has a non-circular cross-section; and a second duct extending from a first end of the second duct to a second end of the second duct, the second end of the first duct being wholly within the second end of the second duct, the first end of the second duct being wholly outside of the first duct.

Example 2 includes the fluid connection of Example 1, in which the second end of the second duct is coaxial with the second end of the first duct.

Example 3 includes the fluid connection of any of Examples 1-2, in which the first duct has a substantially circular cross-section at the first end of the first duct and a substantially circular cross-section at the second end of the first duct.

Example 4 includes the fluid connection of any of Examples 1-3, in which the first end of the first duct has a cross-sectional flow area that is substantially equal to a cross-sectional flow area of the second end of the first duct and to a cross-sectional flow area of the mid-portion of the first duct.

Example 5 includes the fluid connection of any of Examples 1-4, in which the non-circular cross-section of the mid-portion is substantially elliptical.

Example 6 includes the fluid connection of any of Examples 1-5, in which a width of the mid-portion of the first duct in a first direction is less than a width of the mid-portion of the first duct in a second direction, the second direction being substantially perpendicular to the first direction.

Example 7 includes the fluid connection of Example 6, the second duct extending away from the first duct in a direction that has a directional component parallel to a plane defined by the second end of the second duct, the directional component being parallel to the second direction.

Example 8 includes the fluid connection of any of Examples 1-7, further comprising a fairing within the second duct, the fairing comprising a wedge having a vertex radially extending between the second end of the first duct and the second end of the second duct and broadening as the fairing extends away from the second end of the second duct toward the first end of the second duct.

Example 9 includes the fluid connection of Example 8, the fluid connection having a plane of symmetry, the fairing being canted at an angle to the plane of symmetry.

Example 10 includes the fluid connection of any of Examples 8-9, the fluid connection having a plane of symmetry, in which the vertex of the wedge is not on the plane of symmetry.

Example 11 includes the fluid connection of any of Examples 1-10, further comprising a fairing within the second duct, the fairing comprising a wedge extending away from the mid-portion of the first duct toward the second end of the second duct and terminating in a vertex.

Example 12 includes the fluid connection of Example 11, the fluid connection having a plane of symmetry, the fairing being canted at an angle to the plane of symmetry.

Example 13 includes the fluid connection of any of Examples 11-12, the fluid connection having a plane of symmetry, in which the vertex of the wedge is not on the plane of symmetry.

Example 14 includes the fluid connection of any of Examples 11-13, in which the fairing is a first fairing, the fluid connection further comprising a second fairing having a wedge with a vertex radially extending between the second end of the first duct and the second end of the second duct and broadening as the second fairing extends away from the second end of the second duct toward the first end of the second duct.

Example 15 includes the fluid connection of any of Examples 1-14, further comprising an array of guide vanes, each guide vane of the array of guide vanes comprising a blade extending substantially radially between the first duct and the second duct.

Example 16 includes the fluid connection of any of Examples 1-15, each of the first end of the first duct and the first end of the second duct having a cross-sectional area and a centerline passing through a midpoint of the cross-sectional area and perpendicular to the cross-sectional area, the centerline of the first end of the first duct and the centerline of the first end of the second duct being collinear.

Example 17 includes the fluid connection of any of Examples 1-15, in which the mid-portion of the first duct extends to an elbow of the first duct wholly external to the second duct, a cross-sectional area of the first duct gradually increasing from the elbow to the first end of the first duct.

Example 18 includes the fluid connection of Example 17, in which the gradually increasing cross-sectional area is substantially rectangular.

Example 19 includes the fluid connection of Example 17, in which the gradually increasing cross-sectional area is substantially circular.

Example 20 includes a pump-turbine assembly comprising: a reversible pump-turbine having a pump inlet that is coaxial with a pump outlet, a direction of flow into the pump inlet being opposite a direction of flow out of the pump outlet; and a fluid connection comprising: a first duct extending from a first end of the first duct to a second end of the first duct, the first duct including a mid-portion between the first end of the first duct and the second end of the first duct that has a non-circular cross-section, the first duct having a substantially circular cross-section at the first end of the first duct and a substantially circular cross-section at the second end of the first duct, and a second duct extending from a first end of the second duct to a second end of the second duct, the second end of the first duct being wholly within the second end of the second duct, the first end of the second duct being wholly outside of the first duct, the second end of the second duct being coaxial with the second end of the first duct; in which the second end of the first duct is coupled to the pump inlet of the reversible pump-turbine and in which the second end of the second duct is coupled to the pump outlet of the reversible pump-turbine, thereby permitting fluid to flow from the first duct into the pump inlet and from the pump outlet into the second duct.

Example 21 includes the pump-turbine assembly of Example 20, the first duct further including a first portion between the first end of the first duct and the mid-portion of the first duct, and a second portion between the second end of the first duct and the mid-portion of the first duct, a cross-sectional area of the first portion being substantially equal to a cross-sectional area of the first portion and a cross-sectional area of the mid-portion.

Example 22 includes the pump-turbine assembly of any of Examples 20-21, in which a width of the mid-portion of the first duct in a first direction is less than a width of the mid-portion of the first duct in a second direction, the second direction being substantially perpendicular to the first direction.

Example 23 includes the pump-turbine assembly of Example 22, the second duct extending away from the first duct in a direction that has a directional component parallel to a plane defined by the second end of the second duct, the directional component being parallel to the second direction.

Example 24 includes the pump-turbine assembly of any of Examples 20-23, further comprising a fairing within the second duct, the fairing comprising a wedge having a vertex radially extending between the second end of the first duct and the second end of the second duct and broadening as the fairing extends away from the second end of the second duct toward the first end of the second duct.

Example 25 includes the pump-turbine assembly of Example 24, the fluid connection having a plane of symmetry, the fairing being canted at an angle to the plane of symmetry.

Example 26 includes the pump-turbine assembly of any of Examples 24-25, the fluid connection having a plane of symmetry, in which the vertex of the wedge is not on the plane of symmetry.

Example 27 includes the pump-turbine assembly of any of Examples 20-26, further comprising a fairing within the second duct, the fairing comprising a wedge extending away from the mid-portion of the first duct toward the second end of the second duct and terminating in a vertex.

Example 28 includes the pump-turbine assembly of Example 27, the fluid connection having a plane of symmetry, the fairing being canted at an angle to the plane of symmetry.

Example 29 includes the pump-turbine assembly of any of Examples 27-28, the fluid connection having a plane of symmetry, in which the vertex of the wedge is not on the plane of symmetry.

Example 30 includes the pump-turbine assembly of any of Examples 27-29, in which the fairing is a first fairing, the fluid connection further comprising a second fairing having a wedge with a vertex radially extending between the second end of the first duct and the second end of the second duct and broadening as the second fairing extends away from the second end of the second duct toward the first end of the second duct.

Example 31 includes the pump-turbine assembly of any of Examples 20-30, further comprising an array of guide vanes, each guide vane of the array of guide vanes comprising a blade extending substantially radially between the first duct and the second duct.

Example 32 includes the pump-turbine assembly of any of Examples 20-31, each of the first end of the first duct and the first end of the second duct having a cross-sectional area and a centerline passing through a midpoint of the cross-sectional area and perpendicular to the cross-sectional area, the centerline of the first end of the first duct and the centerline of the first end of the second duct being collinear.

Example 33 includes the pump-turbine assembly of any of Examples 20-31, in which the mid-portion of the first duct extends to an elbow of the first duct wholly external to the second duct, a cross-sectional area of the first duct gradually increasing from the elbow to the first end of the first duct.

Example 34 includes the pump-turbine assembly of Example 33, in which the gradually increasing cross-sectional area is substantially rectangular.

Example 35 includes the pump-turbine assembly of Example 33, in which the gradually increasing cross-sectional area is substantially circular.

Example 36 includes a hydromotive-machine assembly comprising: a hydromotive machine having a fluid inlet that is coaxial with a fluid outlet, a direction of flow into the fluid inlet being opposite a direction of flow out of the fluid outlet; and a fluid connection comprising: a first duct extending from a first end of the first duct to a second end of the first duct, the first duct including a mid-portion between the first end of the first duct and the second end of the first duct that has a non-circular cross-section, the first duct having a substantially circular cross-section at the first end of the first duct and a substantially circular cross-section at the second end of the first duct, and a second duct extending from a first end of the second duct to a second end of the second duct, the second end of the first duct being wholly within the second end of the second duct, the first end of the second duct being wholly outside of the first duct, the second end of the second duct being coaxial with the second end of the first duct; in which the second end of the first duct is coupled to the fluid inlet of the hydromotive machine and in which the second end of the second duct is coupled to the fluid outlet of the hydromotive machine, thereby permitting fluid to flow from the first duct into the fluid inlet and from the fluid outlet into the second duct.

Example 37 includes the hydromotive-machine assembly of Example 36, the first duct further including a first portion between the first end of the first duct and the mid-portion of the first duct, and a second portion between the second end of the first duct and the mid-portion of the first duct, a cross-sectional area of the first portion being substantially equal to a cross-sectional area of the first portion and a cross-sectional area of the mid-portion.

Example 38 includes the hydromotive-machine assembly of any of Examples 36-37, in which a width of the mid-portion of the first duct in a first direction is less than a width of the mid-portion of the first duct in a second direction, the second direction being substantially perpendicular to the first direction.

Example 39 includes the hydromotive-machine assembly of Example 38, the second duct extending away from the first duct in a direction that has a directional component parallel to a plane defined by the second end of the second duct, the directional component being parallel to the second direction.

Example 40 includes the hydromotive-machine assembly of any of Examples 36-39, further comprising a fairing within the second duct, the fairing comprising a wedge having a vertex radially extending between the second end of the first duct and the second end of the second duct and broadening as the fairing extends away from the second end of the second duct toward the first end of the second duct.

Example 41 includes the hydromotive-machine assembly of Example 40, the fluid connection having a plane of symmetry, the fairing being canted at an angle to the plane of symmetry.

Example 42 includes the hydromotive-machine assembly of any of Examples 40-41, the fluid connection having a plane of symmetry, in which the vertex of the wedge is not on the plane of symmetry.

Example 43 includes the hydromotive-machine assembly of any of Examples 36-42, further comprising a fairing within the second duct, the fairing comprising a wedge extending away from the mid-portion of the first duct toward the second end of the second duct and terminating in a vertex.

Example 44 includes the hydromotive-machine assembly of Example 43, the fluid connection having a plane of symmetry, the fairing being canted at an angle to the plane of symmetry.

Example 45 includes the hydromotive-machine assembly of any of Examples 43-44, the fluid connection having a plane of symmetry, in which the vertex of the wedge is not on the plane of symmetry.

Example 46 includes the hydromotive-machine assembly of any of Examples 43-45, in which the fairing is a first fairing, the fluid connection further comprising a second fairing having a wedge with a vertex radially extending between the second end of the first duct and the second end of the second duct and broadening as the second fairing extends away from the second end of the second duct toward the first end of the second duct.

Example 47 includes the hydromotive-machine assembly of any of Examples 36-46, further comprising an array of guide vanes, each guide vane of the array of guide vanes comprising a blade extending substantially radially between the first duct and the second duct.

Example 48 includes the hydromotive-machine assembly of any of Examples 36-47, each of the first end of the first duct and the first end of the second duct having a cross-sectional area and a centerline passing through a midpoint of the cross-sectional area and perpendicular to the cross-sectional area, the centerline of the first end of the first duct and the centerline of the first end of the second duct being collinear.

Example 49 includes the hydromotive-machine assembly of any of Examples 36-47, in which the mid-portion of the first duct extends to an elbow of the first duct wholly external to the second duct, a cross-sectional area of the first duct gradually increasing from the elbow to the first end of the first duct.

Example 50 includes the hydromotive-machine assembly of Example 49, in which the gradually increasing cross-sectional area is substantially rectangular.

Example 51 includes the hydromotive-machine assembly of Example 49, in which the gradually increasing cross-sectional area is substantially circular.

Example 52 includes a fluid connection for a hydromotive machine, the fluid connection comprising: a first duct extending from a first end of the first duct to a second end of the first duct; a second duct extending from a first end of the second duct to a second end of the second duct, the second end of the first duct being wholly within the second end of the second duct, the first end of the second duct being wholly outside of the first duct; and a fairing within the second duct, the fairing comprising a wedge having a vertex radially extending between the second end of the first duct and the second end of the second duct and broadening as the fairing extends away from the second end of the second duct toward the first end of the second duct.

Example 53 includes the fluid connection of Example 52, in which the second end of the second duct is coaxial with the second end of the first duct.

Example 54 includes the fluid connection of any of Examples 52-53, the fluid connection having a plane of symmetry, the fairing being canted at an angle to the plane of symmetry.

Example 55 includes the fluid connection of any of Examples 52-54, the fluid connection having a plane of symmetry, in which the vertex of the wedge is not on the plane of symmetry.

Example 56 includes the fluid connection of any of Examples 52-55, further comprising a second fairing within the second duct, the second fairing comprising a wedge extending away from the first duct toward the second end of the second duct and terminating in a vertex.

Example 57 includes the fluid connection of Example 56, the fluid connection having a plane of symmetry, the second fairing being canted at an angle to the plane of symmetry.

Example 58 includes the fluid connection of any of Examples 56-57, the fluid connection having a plane of symmetry, in which the vertex of the wedge of the second fairing is not on the plane of symmetry.

Example 59 includes the fluid connection of any of Examples 52-58, further comprising an array of guide vanes, each guide vane of the array of guide vanes comprising a blade extending substantially radially between the first duct and the second duct.

Example 60 includes the fluid connection of any of Examples 52-59, each of the first end of the first duct and the first end of the second duct having a cross-sectional area and a centerline passing through a midpoint of the cross-sectional area and perpendicular to the cross-sectional area, the centerline of the first end of the first duct and the centerline of the first end of the second duct being collinear.

Example 61 includes the fluid connection of any of Examples 52-60, in which the first duct includes an elbow wholly external to the second duct, a cross-sectional area of the first duct gradually increasing from the elbow to the first end of the first duct.

Example 62 includes the fluid connection of Example 61, in which the gradually increasing cross-sectional area is substantially rectangular.

Example 63 includes the fluid connection of Example 61, in which the gradually increasing cross-sectional area is substantially circular.

Example 64 includes a pump-turbine assembly comprising: a reversible pump-turbine having a pump inlet that is coaxial with a pump outlet, a direction of flow into the pump inlet being opposite a direction of flow out of the pump outlet; and a fluid connection comprising: a first duct extending from a first end of the first duct to a second end of the first duct, a second duct extending from a first end of the second duct to a second end of the second duct, the second end of the first duct being wholly within the second end of the second duct, the first end of the second duct being wholly outside of the first duct, and a fairing within the second duct, the fairing comprising a wedge having a vertex radially extending between the second end of the first duct and the second end of the second duct and broadening as the fairing extends away from the second end of the second duct toward the first end of the second duct; in which the second end of the first duct is coupled to the pump inlet of the reversible pump-turbine and in which the second end of the second duct is coupled to the pump outlet of the reversible pump-turbine, thereby permitting fluid to flow from the first duct into the pump inlet and from the pump outlet into the second duct.

Example 65 includes the pump-turbine assembly of Example 64, in which the second end of the second duct is coaxial with the second end of the first duct.

Example 66 includes the pump-turbine assembly of any of Examples 64-65, the fluid connection having a plane of symmetry, the fairing being canted at an angle to the plane of symmetry.

Example 67 includes the pump-turbine assembly of any of Examples 64-66, the fluid connection having a plane of symmetry, in which the vertex of the wedge is not on the plane of symmetry.

Example 68 includes the pump-turbine assembly of any of Examples 64-67, further comprising a second fairing within the second duct, the second fairing comprising a wedge extending away from the first duct toward the second end of the second duct and terminating in a vertex.

Example 69 includes the pump-turbine assembly of Examples 68, the fluid connection having a plane of symmetry, the second fairing being canted at an angle to the plane of symmetry.

Example 70 includes the pump-turbine assembly of any of Examples 68-69, the fluid connection having a plane of symmetry, in which the vertex of the wedge of the second fairing is not on the plane of symmetry.

Example 71 includes the pump-turbine assembly of any of Examples 64-70, further comprising an array of guide vanes, each guide vane of the array of guide vanes comprising a blade extending substantially radially between the first duct and the second duct.

Example 72 includes the pump-turbine assembly of any of Examples 64-71, each of the first end of the first duct and the first end of the second duct having a cross-sectional area and a centerline passing through a midpoint of the cross-sectional area and perpendicular to the cross-sectional area, the centerline of the first end of the first duct and the centerline of the first end of the second duct being collinear.

Example 73 includes the pump-turbine assembly of any of Examples 64-72, in which the first duct includes an elbow wholly external to the second duct, a cross-sectional area of the first duct gradually increasing from the elbow to the first end of the first duct.

Example 74 includes the pump-turbine assembly of Example 73, in which the gradually increasing cross-sectional area is substantially rectangular.

Example 75 includes the pump-turbine assembly of Example 73, in which the gradually increasing cross-sectional area is substantially circular.

Example 76 includes a hydromotive-machine assembly comprising: a hydromotive machine having a fluid inlet that is coaxial with a fluid outlet, a direction of flow into the fluid inlet being opposite a direction of flow out of the fluid outlet; and a fluid connection comprising: a first duct extending from a first end of the first duct to a second end of the first duct, a second duct extending from a first end of the second duct to a second end of the second duct, the second end of the first duct being wholly within the second end of the second duct, the first end of the second duct being wholly outside of the first duct, and a fairing within the second duct, the fairing comprising a wedge having a vertex radially extending between the second end of the first duct and the second end of the second duct and broadening as the fairing extends away from the second end of the second duct toward the first end of the second duct; in which the second end of the first duct is coupled to the fluid inlet of the hydromotive machine and in which the second end of the second duct is coupled to the fluid outlet of the hydromotive machine, thereby permitting fluid to flow from the first duct into the fluid inlet and from the fluid outlet into the second duct.

Example 77 includes the hydromotive-machine assembly of Example 76, in which the second end of the second duct is coaxial with the second end of the first duct.

Example 78 includes the hydromotive-machine assembly of any of Examples 76-77, the fluid connection having a plane of symmetry, the fairing being canted at an angle to the plane of symmetry.

Example 79 includes the hydromotive-machine assembly of any of Examples 76-78, the fluid connection having a plane of symmetry, in which the vertex of the wedge is not on the plane of symmetry.

Example 80 includes the hydromotive-machine assembly of any of Examples 76-79, further comprising a second fairing within the second duct, the second fairing comprising a wedge extending away from the first duct toward the second end of the second duct and terminating in a vertex.

Example 81 includes the hydromotive-machine assembly of Example 80, the fluid connection having a plane of symmetry, the second fairing being canted at an angle to the plane of symmetry.

Example 82 includes the hydromotive-machine assembly of any of Examples 80-81, the fluid connection having a plane of symmetry, in which the vertex of the wedge of the second fairing is not on the plane of symmetry.

Example 83 includes the hydromotive-machine assembly of any of Examples 76-82, further comprising an array of guide vanes, each guide vane of the array of guide vanes comprising a blade extending substantially radially between the first duct and the second duct.

Example 84 includes the hydromotive-machine assembly of any of Examples 76-83, each of the first end of the first duct and the first end of the second duct having a cross-sectional area and a centerline passing through a midpoint of the cross-sectional area and perpendicular to the cross-sectional area, the centerline of the first end of the first duct and the centerline of the first end of the second duct being collinear.

Example 85 includes the hydromotive-machine assembly of any of Examples 76-84, in which the first duct includes an elbow wholly external to the second duct, a cross-sectional area of the first duct gradually increasing from the elbow to the first end of the first duct.

Example 86 includes the hydromotive-machine assembly of Example 85, in which the gradually increasing cross-sectional area is substantially rectangular.

Example 87 includes the hydromotive-machine assembly of Example 85, in which the gradually increasing cross-sectional area is substantially circular.

Example 88 includes a fluid connection for a hydromotive machine, the fluid connection comprising: a first duct extending from a first end of the first duct to a second end of the first duct; a second duct extending from a first end of the second duct to a second end of the second duct, the second end of the first duct being wholly within the second end of the second duct, the first end of the second duct being wholly outside of the first duct; and a fairing within the second duct, the second fairing comprising a wedge extending away from the first duct toward the second end of the second duct and terminating in a vertex.

Example 89 includes the fluid connection of Example 88, in which the second end of the second duct is coaxial with the second end of the first duct.

Example 90 includes the fluid connection of any of Examples 88-89, the fluid connection having a plane of symmetry, the fairing being canted at an angle to the plane of symmetry.

Example 91 includes the fluid connection of any of Examples 88-90, the fluid connection having a plane of symmetry, in which the vertex of the wedge is not on the plane of symmetry.

Example 92 includes the fluid connection of any of Examples 88-91, further comprising a second fairing within the second duct, the second fairing comprising a wedge having a vertex radially extending between the second end of the first duct and the second end of the second duct and broadening as the second fairing extends away from the second end of the second duct toward the first end of the second duct Example 93 includes the fluid connection of Example 92, the fluid connection having a plane of symmetry, the second fairing being canted at an angle to the plane of symmetry.

Example 94 includes the fluid connection of any of Examples 92-93, the fluid connection having a plane of symmetry, in which the vertex of the wedge of the second fairing is not on the plane of symmetry.

Example 95 includes the fluid connection of any of Examples 88-94, further comprising an array of guide vanes, each guide vane of the array of guide vanes comprising a blade extending substantially radially between the first duct and the second duct.

Example 96 includes the fluid connection of any of Examples 88-95, each of the first end of the first duct and the first end of the second duct having a cross-sectional area and a centerline passing through a midpoint of the cross-sectional area and perpendicular to the cross-sectional area, the centerline of the first end of the first duct and the centerline of the first end of the second duct being collinear.

Example 97 includes the fluid connection of any of Examples 88-96, in which the first duct includes an elbow wholly external to the second duct, a cross-sectional area of the first duct gradually increasing from the elbow to the first end of the first duct.

Example 98 includes the fluid connection of Example 97, in which the gradually increasing cross-sectional area is substantially rectangular.

Example 99 includes the fluid connection of Example 97, in which the gradually increasing cross-sectional area is substantially circular.

Example 100 includes a pump-turbine assembly comprising: a reversible pump-turbine having a pump inlet that is coaxial with a pump outlet, a direction of flow into the pump inlet being opposite a direction of flow out of the pump outlet; and a fluid connection comprising: a first duct extending from a first end of the first duct to a second end of the first duct, a second duct extending from a first end of the second duct to a second end of the second duct, the second end of the first duct being wholly within the second end of the second duct, the first end of the second duct being wholly outside of the first duct, and a fairing within the second duct, the second fairing comprising a wedge extending away from the first duct toward the second end of the second duct and terminating in a vertex; in which the second end of the first duct is coupled to the pump inlet of the reversible pump-turbine and in which the second end of the second duct is coupled to the pump outlet of the reversible pump-turbine, thereby permitting fluid to flow from the first duct into the pump inlet and from the pump outlet into the second duct.

Example 101 includes the pump-turbine assembly of Example 100, in which the second end of the second duct is coaxial with the second end of the first duct.

Example 102 includes the pump-turbine assembly of any of Examples 100-101, the fluid connection having a plane of symmetry, the fairing being canted at an angle to the plane of symmetry.

Example 103 includes the pump-turbine assembly of any of Examples 100-102, the fluid connection having a plane of symmetry, in which the vertex of the wedge is not on the plane of symmetry.

Example 104 includes the pump-turbine assembly of any of Examples 100-103, further comprising a second fairing within the second duct, the second fairing comprising a wedge having a vertex radially extending between the second end of the first duct and the second end of the second duct and broadening as the second fairing extends away from the second end of the second duct toward the first end of the second duct.

Example 105 includes the pump-turbine assembly of Example 104, the fluid connection having a plane of symmetry, the second fairing being canted at an angle to the plane of symmetry.

Example 106 includes the pump-turbine assembly of any of Examples 104-105, the fluid connection having a plane of symmetry, in which the vertex of the wedge of the second fairing is not on the plane of symmetry.

Example 107 includes the pump-turbine assembly of any of Examples 100-106, further comprising an array of guide vanes, each guide vane of the array of guide vanes comprising a blade extending substantially radially between the first duct and the second duct.

Example 108 includes the pump-turbine assembly of any of Examples 100-107, each of the first end of the first duct and the first end of the second duct having a cross-sectional area and a centerline passing through a midpoint of the cross-sectional area and perpendicular to the cross-sectional area, the centerline of the first end of the first duct and the centerline of the first end of the second duct being collinear.

Example 109 includes the pump-turbine assembly of any of Examples 100-108, in which the first duct includes an elbow wholly external to the second duct, a cross-sectional area of the first duct gradually increasing from the elbow to the first end of the first duct.

Example 110 includes the pump-turbine assembly of Example 109, in which the gradually increasing cross-sectional area is substantially rectangular.

Example 111 includes the pump-turbine assembly of Example 109, in which the gradually increasing cross-sectional area is substantially circular.

Example 112 includes a hydromotive-machine assembly comprising: a hydromotive machine having a fluid inlet that is coaxial with a fluid outlet, a direction of flow into the fluid inlet being opposite a direction of flow out of the fluid outlet; and a fluid connection comprising: a first duct extending from a first end of the first duct to a second end of the first duct, a second duct extending from a first end of the second duct to a second end of the second duct, the second end of the first duct being wholly within the second end of the second duct, the first end of the second duct being wholly outside of the first duct, and a fairing within the second duct, the second fairing comprising a wedge extending away from the first duct toward the second end of the second duct and terminating in a vertex; in which the second end of the first duct is coupled to the fluid inlet of the hydromotive machine and in which the second end of the second duct is coupled to the fluid outlet of the hydromotive machine, thereby permitting fluid to flow from the first duct into the fluid inlet and from the fluid outlet into the second duct.

Example 113 includes the hydromotive-machine assembly of Example 112, in which the second end of the second duct is coaxial with the second end of the first duct.

Example 114 includes the hydromotive-machine assembly of any of Examples 112-113, the fluid connection having a plane of symmetry, the fairing being canted at an angle to the plane of symmetry.

Example 115 includes the hydromotive-machine assembly of any of Examples 112-114, the fluid connection having a plane of symmetry, in which the vertex of the wedge is not on the plane of symmetry.

Example 116 includes the hydromotive-machine assembly of any of Examples 112-115, further comprising a second fairing within the second duct, the second fairing comprising a wedge having a vertex radially extending between the second end of the first duct and the second end of the second duct and broadening as the second fairing extends away from the second end of the second duct toward the first end of the second duct.

Example 117 includes the hydromotive-machine assembly of Example 116, the fluid connection having a plane of symmetry, the second fairing being canted at an angle to the plane of symmetry.

Example 118 includes the hydromotive-machine assembly of any of Examples 116-117, the fluid connection having a plane of symmetry, in which the vertex of the wedge of the second fairing is not on the plane of symmetry.

Example 119 includes the hydromotive-machine assembly of any of Examples 112-118, further comprising an array of guide vanes, each guide vane of the array of guide vanes comprising a blade extending substantially radially between the first duct and the second duct.

Example 120 includes the hydromotive-machine assembly of any of Examples 112-119, each of the first end of the first duct and the first end of the second duct having a cross-sectional area and a centerline passing through a midpoint of the cross-sectional area and perpendicular to the cross-sectional area, the centerline of the first end of the first duct and the centerline of the first end of the second duct being collinear.

Example 121 includes the hydromotive-machine assembly of any of Examples 112-120, in which the first duct includes an elbow wholly external to the second duct, a cross-sectional area of the first duct gradually increasing from the elbow to the first end of the first duct.

Example 122 includes the hydromotive-machine assembly of Example 121, in which the gradually increasing cross-sectional area is substantially rectangular.

Example 123 includes the hydromotive-machine assembly of Example 121, in which the gradually increasing cross-sectional area is substantially circular.

Example 124 includes a fluid connection for a hydromotive machine, the fluid connection comprising: a first duct extending from a first end of the first duct to a second end of the first duct; a second duct extending from a first end of the second duct to a second end of the second duct, the second end of the first duct being wholly within the second end of the second duct, the first end of the second duct being wholly outside of the first duct; and an array of guide vanes, each guide vane of the array of guide vanes comprising a blade extending substantially radially between the first duct and the second duct.

Example 125 includes the fluid connection of Example 124, in which the second end of the second duct is coaxial with the second end of the first duct.

Example 126 includes the fluid connection of any of Examples 124-125, in which the first duct has a substantially circular cross-section at the first end of the first duct and a substantially circular cross-section at the second end of the first duct.

Example 127 includes the fluid connection of any of Examples 124-126, in which the first end of the first duct has a cross-sectional flow area that is substantially equal to a cross-sectional flow area of the second end of the first duct and to a cross-sectional flow area of the mid-portion of the first duct.

Example 128 includes the fluid connection of any of Examples 124-127, further comprising a fairing within the second duct, the fairing comprising a wedge having a vertex radially extending between the second end of the first duct and the second end of the second duct and broadening as the fairing extends away from the second end of the second duct toward the first end of the second duct.

Example 129 includes the fluid connection of Example 128, the fluid connection having a plane of symmetry, the fairing being canted at an angle to the plane of symmetry.

Example 130 includes the fluid connection of any of Examples 128-129, the fluid connection having a plane of symmetry, in which the vertex of the wedge is not on the plane of symmetry.

Example 131 includes the fluid connection of any of Examples 124-130, further comprising a fairing within the second duct, the fairing comprising a wedge extending away from the mid-portion of the first duct toward the second end of the second duct and terminating in a vertex.

Example 132 includes the fluid connection of Example 131, the fluid connection having a plane of symmetry, the fairing being canted at an angle to the plane of symmetry.

Example 133 includes the fluid connection of Example 131, the fluid connection having a plane of symmetry, in which the vertex of the wedge is not on the plane of symmetry.

Example 134 includes the fluid connection of any of Examples 131-133, in which the fairing is a first fairing, the fluid connection further comprising a second fairing having a wedge with a vertex radially extending between the second end of the first duct and the second end of the second duct and broadening as the second fairing extends away from the second end of the second duct toward the first end of the second duct.

Example 135 includes the fluid connection of any of Examples 124-134, each of the first end of the first duct and the first end of the second duct having a cross-sectional area and a centerline passing through a midpoint of the cross-sectional area and perpendicular to the cross-sectional area, the centerline of the first end of the first duct and the centerline of the first end of the second duct being collinear.

Example 136 includes the fluid connection of any of Examples 124-135, in which the mid-portion of the first duct extends to an elbow of the first duct wholly external to the second duct, a cross-sectional area of the first duct gradually increasing from the elbow to the first end of the first duct.

Example 137 includes the fluid connection of Example 136, in which the gradually increasing cross-sectional area is substantially rectangular.

Example 138 includes the fluid connection of Example 136, in which the gradually increasing cross-sectional area is substantially circular.

Example 139 includes a pump-turbine assembly comprising: a reversible pump-turbine having a pump inlet that is coaxial with a pump outlet, a direction of flow into the pump inlet being opposite a direction of flow out of the pump outlet; and a fluid connection comprising: a first duct extending from a first end of the first duct to a second end of the first duct, a second duct extending from a first end of the second duct to a second end of the second duct, the second end of the first duct being wholly within the second end of the second duct, the first end of the second duct being wholly outside of the first duct, and an array of guide vanes, each guide vane of the array of guide vanes comprising a blade extending substantially radially between the first duct and the second duct; in which the second end of the first duct is coupled to the pump inlet of the reversible pump-turbine and in which the second end of the second duct is coupled to the pump outlet of the reversible pump-turbine, thereby permitting fluid to flow from the first duct into the pump inlet and from the pump outlet into the second duct.

Example 140 includes the fluid connection of Example 139, in which the second end of the second duct is coaxial with the second end of the first duct.

Example 141 includes the fluid connection of any of Examples 139-140, in which the first duct has a substantially circular cross-section at the first end of the first duct and a substantially circular cross-section at the second end of the first duct.

Example 142 includes the fluid connection of any of Examples 139-141, in which the first end of the first duct has a cross-sectional flow area that is substantially equal to a cross-sectional flow area of the second end of the first duct and to a cross-sectional flow area of the mid-portion of the first duct.

Example 143 includes the fluid connection of any of Examples 139-142, further comprising a fairing within the second duct, the fairing comprising a wedge having a vertex radially extending between the second end of the first duct and the second end of the second duct and broadening as the fairing extends away from the second end of the second duct toward the first end of the second duct.

Example 144 includes the fluid connection of Example 143, the fluid connection having a plane of symmetry, the fairing being canted at an angle to the plane of symmetry.

Example 145 includes the fluid connection of any of Examples 143-144, the fluid connection having a plane of symmetry, in which the vertex of the wedge is not on the plane of symmetry.

Example 146 includes the fluid connection of any of Examples 139-145, further comprising a fairing within the second duct, the fairing comprising a wedge extending away from the mid-portion of the first duct toward the second end of the second duct and terminating in a vertex.

Example 147 includes the fluid connection of Example 146, the fluid connection having a plane of symmetry, the fairing being canted at an angle to the plane of symmetry.

Example 148 includes the fluid connection of any of Examples 146-147, the fluid connection having a plane of symmetry, in which the vertex of the wedge is not on the plane of symmetry.

Example 149 includes the fluid connection of any of Examples 146-148, in which the fairing is a first fairing, the fluid connection further comprising a second fairing having a wedge with a vertex radially extending between the second end of the first duct and the second end of the second duct and broadening as the second fairing extends away from the second end of the second duct toward the first end of the second duct.

Example 150 includes the fluid connection of any of Examples 139-149, each of the first end of the first duct and the first end of the second duct having a cross-sectional area and a centerline passing through a midpoint of the cross-sectional area and perpendicular to the cross-sectional area, the centerline of the first end of the first duct and the centerline of the first end of the second duct being collinear.

Example 151 includes the fluid connection of any of Examples 139-150, in which the mid-portion of the first duct extends to an elbow of the first duct wholly external to the second duct, a cross-sectional area of the first duct gradually increasing from the elbow to the first end of the first duct.

Example 152 includes the fluid connection of Example 151, in which the gradually increasing cross-sectional area is substantially rectangular.

Example 153 includes the fluid connection of Example 151, in which the gradually increasing cross-sectional area is substantially circular.

Example 154 includes a hydromotive-machine assembly comprising: a hydromotive machine having a fluid inlet that is coaxial with a fluid outlet, a direction of flow into the fluid inlet being opposite a direction of flow out of the fluid outlet; and a fluid connection comprising: a first duct extending from a first end of the first duct to a second end of the first duct, a second duct extending from a first end of the second duct to a second end of the second duct, the second end of the first duct being wholly within the second end of the second duct, the first end of the second duct being wholly outside of the first duct, and an array of guide vanes, each guide vane of the array of guide vanes comprising a blade extending substantially radially between the first duct and the second duct; in which the second end of the first duct is coupled to the fluid inlet of the hydromotive machine and in which the second end of the second duct is coupled to the fluid outlet of the hydromotive machine, thereby permitting fluid to flow from the first duct into the fluid inlet and from the fluid outlet into the second duct.

Example 155 includes the hydromotive-machine assembly of Example 154, in which the second end of the second duct is coaxial with the second end of the first duct.

Example 156 includes the hydromotive-machine assembly of any of Examples 154-155, in which the first duct has a substantially circular cross-section at the first end of the first duct and a substantially circular cross-section at the second end of the first duct.

Example 157 includes the hydromotive-machine assembly of any of Examples 154-156, in which the first end of the first duct has a cross-sectional flow area that is substantially equal to a cross-sectional flow area of the second end of the first duct and to a cross-sectional flow area of the mid-portion of the first duct.

Example 158 includes the hydromotive-machine assembly of any of Examples 154-157, further comprising a fairing within the second duct, the fairing comprising a wedge having a vertex radially extending between the second end of the first duct and the second end of the second duct and broadening as the fairing extends away from the second end of the second duct toward the first end of the second duct.

Example 159 includes the hydromotive-machine assembly of Example 158, the fluid connection having a plane of symmetry, the fairing being canted at an angle to the plane of symmetry.

Example 160 includes the hydromotive-machine assembly of any of Examples 158-159, the fluid connection having a plane of symmetry, in which the vertex of the wedge is not on the plane of symmetry.

Example 161 includes the hydromotive-machine assembly of any of Examples 154-160, further comprising a fairing within the second duct, the fairing comprising a wedge extending away from the mid-portion of the first duct toward the second end of the second duct and terminating in a vertex.

Example 162 includes the hydromotive-machine assembly of Example 161, the fluid connection having a plane of symmetry, the fairing being canted at an angle to the plane of symmetry.

Example 163 includes the hydromotive-machine assembly of any of Examples 161-162, the fluid connection having a plane of symmetry, in which the vertex of the wedge is not on the plane of symmetry.

Example 164 includes the hydromotive-machine assembly of any of Examples 161-163, in which the fairing is a first fairing, the fluid connection further comprising a second fairing having a wedge with a vertex radially extending between the second end of the first duct and the second end of the second duct and broadening as the second fairing extends away from the second end of the second duct toward the first end of the second duct.

Example 165 includes the hydromotive-machine assembly of any of Examples 154-164, each of the first end of the first duct and the first end of the second duct having a cross-sectional area and a centerline passing through a midpoint of the cross-sectional area and perpendicular to the cross-sectional area, the centerline of the first end of the first duct and the centerline of the first end of the second duct being collinear.

Example 166 includes the hydromotive-machine assembly of any of Examples 154-166, in which the mid-portion of the first duct extends to an elbow of the first duct wholly external to the second duct, a cross-sectional area of the first duct gradually increasing from the elbow to the first end of the first duct.

Example 167 includes the hydromotive-machine assembly of Example 166, in which the gradually increasing cross-sectional area is substantially rectangular.

Example 168 includes the hydromotive-machine assembly of Example 166, in which the gradually increasing cross-sectional area is substantially circular.

Example 169 includes a valve assembly comprising: a fluid-control valve having a valve inlet that is coaxial with a valve outlet, a direction of flow into the valve inlet being opposite a direction of flow out of the valve outlet; and a fluid connection comprising: a first duct extending from a first end of the first duct to a second end of the first duct, the first duct including a mid-portion between the first end of the first duct and the second end of the first duct that has a non-circular cross-section, the first duct having a substantially circular cross-section at the first end of the first duct and a substantially circular cross-section at the second end of the first duct, and a second duct extending from a first end of the second duct to a second end of the second duct, the second end of the first duct being wholly within the second end of the second duct, the first end of the second duct being wholly outside of the first duct, the second end of the second duct being coaxial with the second end of the first duct; in which the second end of the first duct is coupled to the valve inlet of the fluid-control valve and in which the second end of the second duct is coupled to the valve outlet of the fluid-control valve, thereby permitting fluid to flow from the first duct into the valve inlet and from the valve outlet into the second duct.

Example 170 includes the valve assembly of Example 169, the first duct further including a first portion between the first end of the first duct and the mid-portion of the first duct, and a second portion between the second end of the first duct and the mid-portion of the first duct, a cross-sectional area of the first portion being substantially equal to a cross-sectional area of the first portion and a cross-sectional area of the mid-portion.

Example 171 includes the valve assembly of any of Examples 169-170, in which a width of the mid-portion of the first duct in a first direction is less than a width of the mid-portion of the first duct in a second direction, the second direction being substantially perpendicular to the first direction.

Example 172 includes the valve assembly of Example 171, the second duct extending away from the first duct in a direction that has a directional component parallel to a plane defined by the second end of the second duct, the directional component being parallel to the second direction.

Example 173 includes the valve assembly of any of Examples 169-172, further comprising a fairing within the second duct, the fairing comprising a wedge having a vertex radially extending between the second end of the first duct and the second end of the second duct and broadening as the fairing extends away from the second end of the second duct toward the first end of the second duct.

Example 174 includes the valve assembly of Example 173, the fluid connection having a plane of symmetry, the fairing being canted at an angle to the plane of symmetry.

Example 175 includes the valve assembly of any of Examples 173-174, the fluid connection having a plane of symmetry, in which the vertex of the wedge is not on the plane of symmetry.

Example 176 includes the valve assembly of any of Examples 169-175, further comprising a fairing within the second duct, the fairing comprising a wedge extending away from the mid-portion of the first duct toward the second end of the second duct and terminating in a vertex.

Example 177 includes the valve assembly of Example 176, the fluid connection having a plane of symmetry, the fairing being canted at an angle to the plane of symmetry.

Example 178 includes the valve assembly of any of Examples 176-177, the fluid connection having a plane of symmetry, in which the vertex of the wedge is not on the plane of symmetry.

Example 179 includes the valve assembly of any of Examples 176-178, in which the fairing is a first fairing, the fluid connection further comprising a second fairing having a wedge with a vertex radially extending between the second end of the first duct and the second end of the second duct and broadening as the second fairing extends away from the second end of the second duct toward the first end of the second duct.

Example 180 includes the valve assembly of any of Examples 169-179, further comprising an array of guide vanes, each guide vane of the array of guide vanes comprising a blade extending substantially radially between the first duct and the second duct.

Example 181 includes the valve assembly of any of Examples 169-180, each of the first end of the first duct and the first end of the second duct having a cross-sectional area and a centerline passing through a midpoint of the cross-sectional area and perpendicular to the cross-sectional area, the centerline of the first end of the first duct and the centerline of the first end of the second duct being collinear.

The contents of the present document have been presented for purposes of illustration and description, but such contents are not intended to be exhaustive or limited to the disclosure in the form disclosed. Many modifications and variations will be apparent to those of ordinary skill in the art without departing from the scope and spirit of the disclosure.

The aspects of the disclosure in this document were chosen and described to explain the principles of the disclosure and the practical application, and to enable others of ordinary skill in the art to understand the disclosure with various modifications as are suited to the particular use contemplated.

Accordingly, it is to be understood that the disclosure in this specification includes all possible combinations of the particular features referred to in this specification. For example, where a particular feature is disclosed in the context of a particular example configuration, that feature can also be used, to the extent possible, in the context of other example configurations.

Additionally, the described versions of the disclosed subject matter have many advantages that were either described or would be apparent to a person of ordinary skill. Even so, all of these advantages or features are not required in all versions of the disclosed apparatus, systems, or methods.

Also, when reference is made in this application to a method having two or more defined steps or operations, the defined steps or operations can be carried out in any order or simultaneously, unless the context excludes those possibilities.

The terminology used in this specification is for the purpose of describing particular aspects only and is not intended to be limiting of the disclosure. As used herein, the singular forms "a," "an," and "the" are intended to include the plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof. Hence, for example, an article "comprising" or "which comprises" components A, B, and C can contain only components A, B, and C, or it can contain components A, B, and C along with one or more other components.

Also, directions such as “vertical,” “horizontal,” “right,” and “left” are used for convenience and in reference to the views provided in figures. But the fluid connection may have a number of orientations in actual use. Thus, a feature that is vertical, horizontal, to the right, or to the left in the figures may not have that same orientation or direction in actual use.

It is understood that the present subject matter may be embodied in many different forms and should not be construed as being limited to the example configurations set forth in this specification. Rather, these example configurations are provided so that this subject matter will be thorough and complete and will convey the disclosure to those skilled in the art. Indeed, the subject matter is intended to cover alternatives, modifications, and equivalents of these example configurations, which are included within the scope and spirit of the subject matter set forth in this disclosure. Furthermore, in the detailed description of the present subject matter, specific details are set forth to provide a thorough understanding of the present subject matter. It will be clear to those of ordinary skill in the art, however, that the present subject matter may be practiced without such specific details.

I claim:

1. A pump-turbine assembly comprising:

a reversible pump-turbine having a pump inlet that is coaxial with a pump outlet, a direction of flow into the pump inlet being opposite a direction of flow out of the pump outlet; and a fluid connection comprising:

a first duct extending from a first end of the first duct to a second end of the first duct, the first duct including a mid-portion between the first end of the first duct and the second end of the first duct that has a non-circular cross-section, the first duct having a substantially circular cross-section at the first end of the first duct and a substantially circular cross-section at the second end of the first duct, and a second duct extending from a first end of the second duct to a second end of the second duct, the second end of the first duct being wholly within the second end of the second duct, the first end of the second duct being wholly outside of the first duct, the second end of the second duct being coaxial with the second end of the first duct;

in which the second end of the first duct is coupled to the pump inlet of the reversible pump-turbine and in which the second end of the second duct is coupled to the pump outlet of the reversible pump-turbine, thereby permitting fluid to flow from the first duct into the pump inlet and from the pump outlet into the second duct, the first duct further including a first portion between the first end of the first duct and the mid-portion of the first duct, and a second portion between the second end of the first duct and the mid-portion of the first duct, a cross-sectional area of the first portion being substantially equal to a cross-sectional area of the first portion and a cross-sectional area of the mid-portion.

2. A pump-turbine assembly comprising:

a reversible pump-turbine having a pump inlet that is coaxial with a pump outlet, a direction of flow into the pump inlet being opposite a direction of flow out of the pump outlet; and a fluid connection comprising:

a first duct extending from a first end of the first duct to a second end of the first duct, the first duct including a mid-portion between the first end of the first duct and the second end of the first duct that has a non-circular cross-section, the first duct having a substantially circular cross-section at the first end of the first duct and a substantially circular cross-section at the second end of the first duct, and a second duct extending from a first end of the second duct to a second end of the second duct, the second end of the first duct being wholly within the second end of the second duct, the first end of the second duct being wholly outside of the first duct, the second end of the second duct being coaxial with the second end of the first duct;

in which the second end of the first duct is coupled to the pump inlet of the reversible pump-turbine and in which the second end of the second duct is coupled to the pump outlet of the reversible pump-turbine, thereby permitting fluid to flow from the first duct into the pump inlet and from the pump outlet into the second duct, and in which a width of the mid-portion of the first duct in a first direction is less than a width of the mid-portion of the first duct in a second direction, the second direction being substantially perpendicular to the first direction.

3. The pump-turbine assembly of claim 2, the second duct extending away from the first duct in a direction that has a directional component parallel to a plane defined by the second end of the second duct, the directional component being parallel to the second direction.

4. A pump-turbine assembly comprising:

a reversible pump-turbine having a pump inlet that is coaxial with a pump outlet, a direction of flow into the pump inlet being opposite a direction of flow out of the pump outlet; and a fluid connection comprising:

a first duct extending from a first end of the first duct to a second end of the first duct, the first duct including a mid-portion between the first end of the first duct and the second end of the first duct that has a non-circular cross-section, the first duct having a substantially circular cross-section at the first end of the first duct and a substantially circular cross-section at the second end of the first duct, and a second duct extending from a first end of the second duct to a second end of the second duct, the second end of the first duct being wholly within the second end of the second duct, the first end of the second duct being wholly outside of the first duct, the second end of the second duct being coaxial with the second end of the first duct;

in which the second end of the first duct is coupled to the pump inlet of the reversible pump-turbine and in which the second end of the second duct is coupled to the pump outlet of the reversible pump-turbine, thereby permitting fluid to flow from the first duct into the pump inlet and from the pump outlet into the second duct, the fluid connection further comprising a fairing within the second duct, the fairing comprising a wedge having a vertex radially extending between the second end of the first duct and the second end of the second duct and broadening as the fairing extends away from the second end of the second duct toward the first end of the second duct.

5. The pump-turbine assembly of claim 4, the fluid connection having a plane of symmetry, the fairing being canted at an angle to the plane of symmetry.

6. The pump-turbine assembly of claim 4, the fluid connection having a plane of symmetry, in which the vertex of the wedge is not on the plane of symmetry.

7. A pump-turbine assembly comprising:

a reversible pump-turbine having a pump inlet that is coaxial with a pump outlet, a direction of flow into the pump inlet being opposite a direction of flow out of the pump outlet; and a fluid connection comprising:

a first duct extending from a first end of the first duct to a second end of the first duct, the first duct including a mid-portion between the first end of the first duct and the second end of the first duct that has a non-circular cross-section, the first duct having a substantially circular cross-section at the first end of the first duct and a substantially circular cross-section at the second end of the first duct, and a second duct extending from a first end of the second duct to a second end of the second duct, the second end of the first duct being wholly within the second end of the second duct, the first end of the second duct being wholly outside of the first duct, the second end of the second duct being coaxial with the second end of the first duct;

in which the second end of the first duct is coupled to the pump inlet of the reversible pump-turbine and in which the second end of the second duct is coupled to the pump outlet of the reversible pump-turbine, thereby permitting fluid to flow from the first duct into the pump inlet and from the pump outlet into the second duct, the fluid connection further comprising a fairing within the second duct, the fairing comprising a wedge extending away from the mid-portion of the first duct toward the second end of the second duct and terminating in a vertex.

8. The pump-turbine assembly of claim 7, the fluid connection having a plane of symmetry, the fairing being canted at an angle to the plane of symmetry.

9. The pump-turbine assembly of claim 7, the fluid connection having a plane of symmetry, in which the vertex of the wedge is not on the plane of symmetry.

10. The pump-turbine assembly of claim 7, in which the fairing is a first fairing, the fluid connection further comprising a second fairing having a wedge with a vertex radially extending between the second end of the first duct and the second end of the second duct and broadening as the second fairing extends away from the second end of the second duct toward the first end of the second duct.

11. A pump-turbine assembly comprising:

a reversible pump-turbine having a pump inlet that is coaxial with a pump outlet, a direction of flow into the pump inlet being opposite a direction of flow out of the pump outlet; and a fluid connection comprising:

a first duct extending from a first end of the first duct to a second end of the first duct, the first duct including a mid-portion between the first end of the first duct and the second end of the first duct that has a non-circular cross-section, the first duct having a substantially circular cross-section at the first end of the first duct and a substantially circular cross-section at the second end of the first duct, and a second duct extending from a first end of the second duct to a second end of the second duct, the second end of the first duct being wholly within the second end of the second duct, the first end of the second duct being wholly outside of the first duct, the second end of the second duct being coaxial with the second end of the first duct;

in which the second end of the first duct is coupled to the pump inlet of the reversible pump-turbine and in which the second end of the second duct is coupled to the pump outlet of the reversible pump-turbine, thereby permitting fluid to flow from the first duct into the pump inlet and from the pump outlet into the second duct, the fluid connection further comprising an array of guide vanes, each guide vane of the array of guide vanes comprising a blade extending substantially radially between the first duct and the second duct.

12. A pump-turbine assembly comprising:

a reversible pump-turbine having a pump inlet that is coaxial with a pump outlet, a direction of flow into the pump inlet being opposite a direction of flow out of the pump outlet; and a fluid connection comprising:

a first duct extending from a first end of the first duct to a second end of the first duct, the first duct including a mid-portion between the first end of the first duct and the second end of the first duct that has a non-circular cross-section, the first duct having a substantially circular cross-section at the first end of the first duct and a substantially circular cross-section at the second end of the first duct, and a second duct extending from a first end of the second duct to a second end of the second duct, the second end of the first duct being wholly within the second end of the second duct, the first end of the second duct being wholly outside of the first duct, the second end of the second duct being coaxial with the second end of the first duct;

in which the second end of the first duct is coupled to the pump inlet of the reversible pump-turbine and in which the second end of the second duct is coupled to the pump outlet of the reversible pump-turbine, thereby permitting fluid to flow from the first duct into the pump inlet and from the pump outlet into the second duct, each of the first end of the first duct and the first end of the second duct having a cross-sectional area and a centerline passing through a midpoint of the cross-sectional area and perpendicular to the cross-sectional area, the centerline of the first end of the first duct and the centerline of the first end of the second duct being collinear.

13. A pump-turbine assembly comprising:

a reversible pump-turbine having a pump inlet that is coaxial with a pump outlet, a direction of flow into the pump inlet being opposite a direction of flow out of the pump outlet; and a fluid connection comprising:

a first duct extending from a first end of the first duct to a second end of the first duct, the first duct including a mid-portion between the first end of the first duct and the second end of the first duct that has a non-circular cross-section, the first duct having a substantially circular cross-section at the first end of the first duct and a substantially circular cross-section at the second end of the first duct, and a second duct extending from a first end of the second duct to a second end of the second duct, the second end of the first duct being wholly within the second end of the second duct, the first end of the second duct being wholly outside of the first duct, the second end of the second duct being coaxial with the second end of the first duct;

in which the second end of the first duct is coupled to the pump inlet of the reversible pump-turbine and in which the second end of the second duct is coupled to the pump outlet of the reversible pump-turbine, thereby permitting fluid to flow from the first duct into the pump inlet and from the pump outlet into the second duct, and in which the mid-portion of the first duct extends to an elbow of the first duct wholly external to the second duct, a cross-sectional area of the first duct gradually increasing from the elbow to the first end of the first duct.

14. The pump-turbine assembly of claim 13, in which the gradually increasing cross-sectional area is substantially rectangular.

15. The pump-turbine assembly of claim 13, in which the gradually increasing cross-sectional area is substantially circular.

* * * * *